(12) United States Patent
Chung et al.

(10) Patent No.: US 12,153,943 B2
(45) Date of Patent: Nov. 26, 2024

(54) ELECTRONIC DEVICE DISPLAYING USER INTERFACE AND METHOD FOR OPERATING THE SAME

(71) Applicant: SAMSUNG ELECTRONICS CO., LTD., Suwon-si (KR)

(72) Inventors: Jinkyo Chung, Suwon-si (KR); Yunsung Choi, Suwon-si (KR); Yookyung Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/876,995

(22) Filed: Jul. 29, 2022

(65) Prior Publication Data
US 2023/0030320 A1 Feb. 2, 2023

Related U.S. Application Data

(63) Continuation of application No. PCT/KR2022/009075, filed on Jun. 24, 2022.

(30) Foreign Application Priority Data

Aug. 2, 2021 (KR) .................. 10-2021-0101284

(51) Int. Cl.
 *G06F 9/451* (2018.01)
 *G06F 3/0482* (2013.01)
 *G06F 3/0486* (2013.01)

(52) U.S. Cl.
 CPC ............ *G06F 9/453* (2018.02); *G06F 3/0482* (2013.01); *G06F 3/0486* (2013.01)

(58) Field of Classification Search
 CPC ....... G06F 9/453; G06F 9/0482; G06F 9/0486
 See application file for complete search history.

(56) References Cited

U.S. PATENT DOCUMENTS 5,714,971 A * 2/1998 Shalit .................... G06F 3/0481
 715/792
5,724,532 A * 3/1998 Thomson ................. G06F 9/54
 719/329

(Continued)

FOREIGN PATENT DOCUMENTS

KR  1020120130404 A  12/2012
KR  1020130080179 A   7/2013

(Continued)

OTHER PUBLICATIONS

International Search Report (PCT/ISA/210) dated Sep. 28, 2022 issued by the International Searching Authority in International Application No. PCT/KR2022/009075.

(Continued)

*Primary Examiner* — Tadesse Hailu
(74) *Attorney, Agent, or Firm* — Sughrue Mion, PLLC

(57) ABSTRACT

According to various embodiments, an electronic device may comprise a display and a processor, wherein the processor is configured to control the display to display a plurality of contents related to an application in a first area of the display, and a plurality of objects for performing a plurality of functions related to the application in a second area of the display, select a first content from among the plurality of contents based on a first input on the display, identify at least one function corresponding to the first content among the plurality of functions, based on identifying a second input to the first content on the display, and control the display to display at least one object corresponding to the at least one function among the plurality of objects in the second area, to be visually distinguished.

19 Claims, 32 Drawing Sheets

(56) References Cited

U.S. PATENT DOCUMENTS

| | | | |
|---|---|---|---|
| 8,959,446 B2* | 2/2015 | Igeta | G06F 3/0481 |
| | | | 715/822 |
| 9,055,326 B2* | 6/2015 | Lee | H04N 21/482 |
| 10,444,976 B2* | 10/2019 | Nilo | G06F 21/6209 |
| 10,635,299 B2* | 4/2020 | Peterson | G06F 3/0486 |
| 2003/0184587 A1 | 10/2003 | Ording et al. | |
| 2004/0125144 A1* | 7/2004 | Yoon | G06F 16/40 |
| | | | 715/769 |
| 2005/0060653 A1* | 3/2005 | Fukase | G06F 3/0486 |
| | | | 715/769 |
| 2007/0150834 A1* | 6/2007 | Muller | G06F 3/0486 |
| | | | 715/810 |
| 2007/0162872 A1* | 7/2007 | Hong | G06F 3/0482 |
| | | | 715/828 |
| 2008/0077874 A1* | 3/2008 | Garbow | G06F 3/0486 |
| | | | 715/764 |
| 2009/0193351 A1 | 7/2009 | Lee et al. | |
| 2009/0259959 A1 | 10/2009 | Grotjohn et al. | |
| 2009/0313299 A1* | 12/2009 | Bonev | G06F 3/0481 |
| 2010/0125806 A1* | 5/2010 | Igeta | G06F 3/0486 |
| | | | 715/806 |
| 2012/0304084 A1 | 11/2012 | Kim et al. | |
| 2013/0055129 A1* | 2/2013 | Lee | H04N 21/4312 |
| | | | 715/769 |
| 2013/0091443 A1* | 4/2013 | Park | G06Q 10/107 |
| | | | 715/758 |
| 2013/0174069 A1 | 7/2013 | Lee | |
| 2013/0174070 A1* | 7/2013 | Briand | G06F 3/04842 |
| | | | 715/769 |
| 2013/0185665 A1* | 7/2013 | Furukawa | G06F 3/04817 |
| | | | 715/765 |
| 2013/0187861 A1* | 7/2013 | Lavallee | G06F 3/0486 |
| | | | 345/173 |
| 2013/0275901 A1* | 10/2013 | Saas | G06F 3/0486 |
| | | | 715/769 |
| 2013/0285948 A1 | 10/2013 | Zhang | |
| 2013/0321340 A1* | 12/2013 | Seo | H04M 1/724 |
| | | | 345/174 |
| 2014/0137019 A1* | 5/2014 | Paulsen | G06F 3/0486 |
| | | | 715/769 |
| 2014/0218372 A1* | 8/2014 | Missig | G06F 3/04883 |
| | | | 345/173 |
| 2014/0223366 A1* | 8/2014 | Sato | H04N 1/00474 |
| | | | 715/810 |
| 2014/0333632 A1 | 11/2014 | Kim | |
| 2015/0067590 A1* | 3/2015 | Lee | G06F 3/0484 |
| | | | 715/803 |
| 2015/0143299 A1 | 5/2015 | Kim et al. | |
| 2015/0365548 A1* | 12/2015 | Katsumata | G06F 3/0482 |
| | | | 715/784 |
| 2016/0139776 A1 | 5/2016 | Donahue et al. | |
| 2016/0357383 A1 | 12/2016 | Cummins et al. | |
| 2017/0024407 A1 | 1/2017 | Park et al. | |
| 2018/0335914 A1* | 11/2018 | Nilo | G06F 3/0412 |
| 2019/0087994 A1* | 3/2019 | Mizutani | G06T 11/60 |
| 2019/0392085 A1* | 12/2019 | Ragan, Jr. | G06F 16/2428 |
| 2021/0096715 A1* | 4/2021 | Lee | G06F 1/1618 |

FOREIGN PATENT DOCUMENTS

| | | |
|---|---|---|
| KR | 1020140033912 A | 3/2014 |
| KR | 1020150006566 A | 1/2015 |
| KR | 1020150057341 A | 5/2015 |
| KR | 1020160123090 A | 10/2016 |
| KR | 1020170011009 A | 2/2017 |
| KR | 1020170115863 A | 10/2017 |
| KR | 102157327 B1 | 9/2020 |

OTHER PUBLICATIONS

Written Opinion (PCT/ISA/237) dated Sep. 28, 2022 issued by the International Searching Authority in International Application No. PCT/KR2022/009075.

Communication issued on Sep. 18, 2024 by the European Patent Office for European Patent Application No. 22853262.8.

* cited by examiner

ELECTRONIC DEVICE DISPLAYING USER INTERFACE AND METHOD FOR OPERATING THE SAME

CROSS-REFERENCE TO RELATED APPLICATIONS

This application is a continuation of International Application No. PCT/KR2022/009075 designating the United States, filed on Jun. 24, 2022, in the Korean Intellectual Property Receiving Office and claiming priority to Korean Patent Application No. 10-2021-0101284, filed on Aug. 2, 2021, in the Korean Intellectual Property Receiving Office, the disclosures of which are incorporated by reference herein in their entireties

BACKGROUND

1. Field

The disclosure relates to an electronic device displaying a user interface and a method for operating the same.

2. Description of Related Art

Various electronic devices are commonplace, such as smartphones, tablet PCs, portable multimedia players (PMPs), personal digital assistants (PDAs), laptop PCs, and wearable devices.

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

Recently, various electronic devices having a large screen display have been developed and distributed. For example, electronic devices with a foldable display or flexible display and devices with a rollable display have been developed and distributed. As large screen display-equipped devices are distributed, various methods may be provided for use of the large screen.

A conventional electronic device provides a user interface simply to indicate that content is moved when content displayed on the display is selected by a long press input of a user. Further, the conventional electronic device provides information about the function that may be performed using content selected by the user only when the content is moved to the inside of a specific area. In other words, the user cannot easily know the function that may be performed using content although the content is selected.

Various embodiments may provide an electronic device that visually displays a function, which may be performed using content displayed on the display, through a separate object if the content is selected by the user's input and a method for operating the same.

SUMMARY

According to various embodiments, an electronic device may comprise a display and a processor, wherein the processor is configured to control the display to display a plurality of contents related to an application in a first area of the display, and a plurality of objects for performing a plurality of functions related to the application in a second area of the display, select a first content from among the plurality of contents based on a first input on the display, identify at least one function corresponding to the first content among the plurality of functions, based on identifying a second input to the first content on the display, and control the display to display at least one object corresponding to the at least one function among the plurality of objects in the second area, to be visually distinguished.

According to various embodiments, a method for operating an electronic device may comprise displaying a plurality of contents related to an application in a first area of a display of the electronic device, displaying a plurality of objects for performing a plurality of functions related to the application in a second area of the display, selecting a first content from among the plurality of contents based on a first input on the display, identifying at least one function corresponding to the first content among the plurality of functions, based on identifying a second input to the first content on the display, and displaying at least one object corresponding to the at least one function among the plurality of objects displayed in the second area, to be visually distinguished.

According to various embodiments, a non-transitory recording medium may store one or more programs, the one or more programs comprising instructions configured to, when executed by a processor of an electronic device, cause the electronic device to, display a plurality of contents related to an application in a first area of a display of the electronic device, display a plurality of objects for performing a plurality of functions related to the application in a second area of the display, select a first content from among the plurality of contents based on a first input on the display, identify at least one function corresponding to the first content among the plurality of functions, based on identifying a second input to the first content on the display, and display at least one object corresponding to the at least one function among the plurality of objects displayed in the second area, to be visually distinguished.

According to various embodiments, if content is selected through a user input, the electronic device may visually display, to the user, a function that may be performed using the content, thereby simplifying the user's additional operation and allowing the user to focus on the user's desired task.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
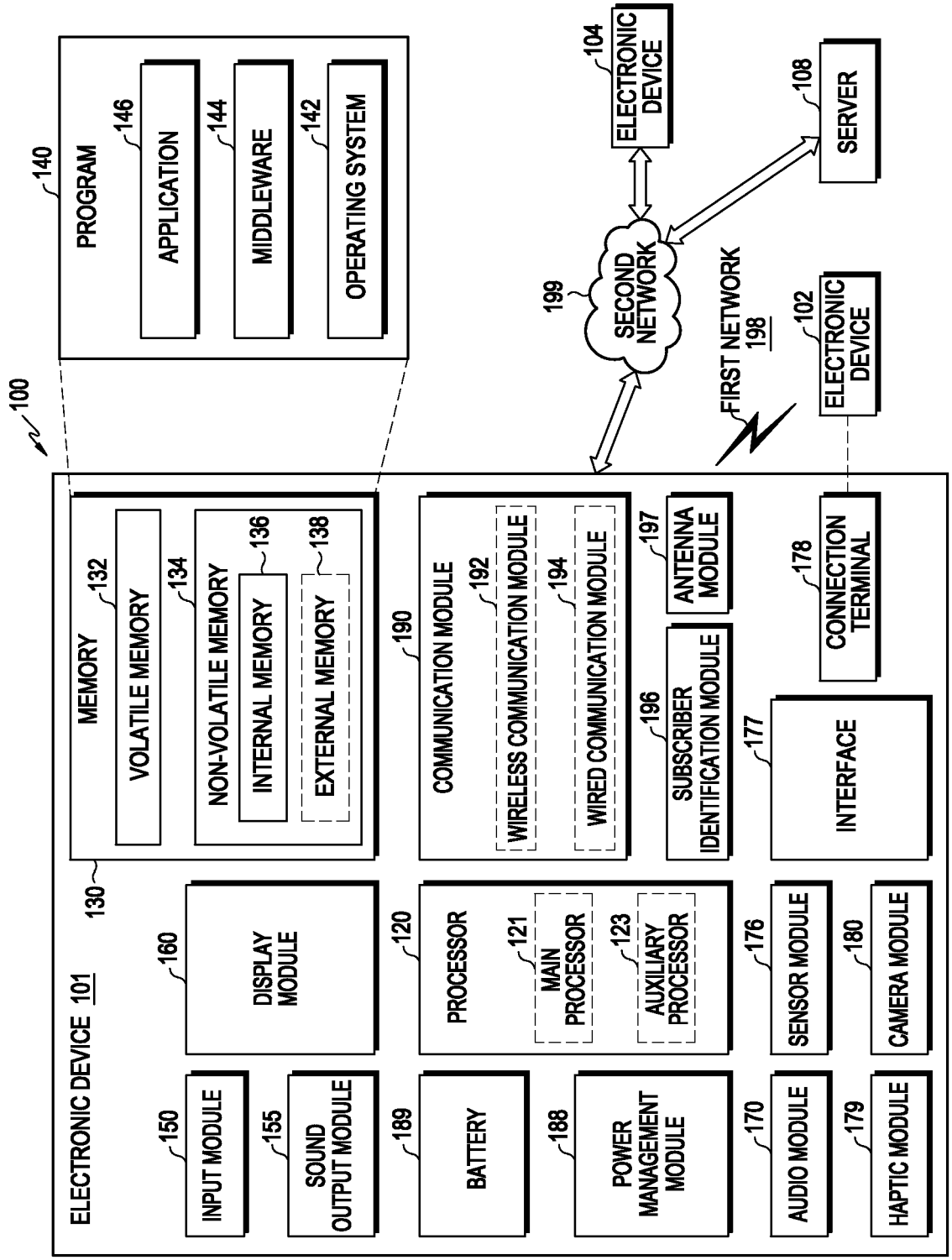
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
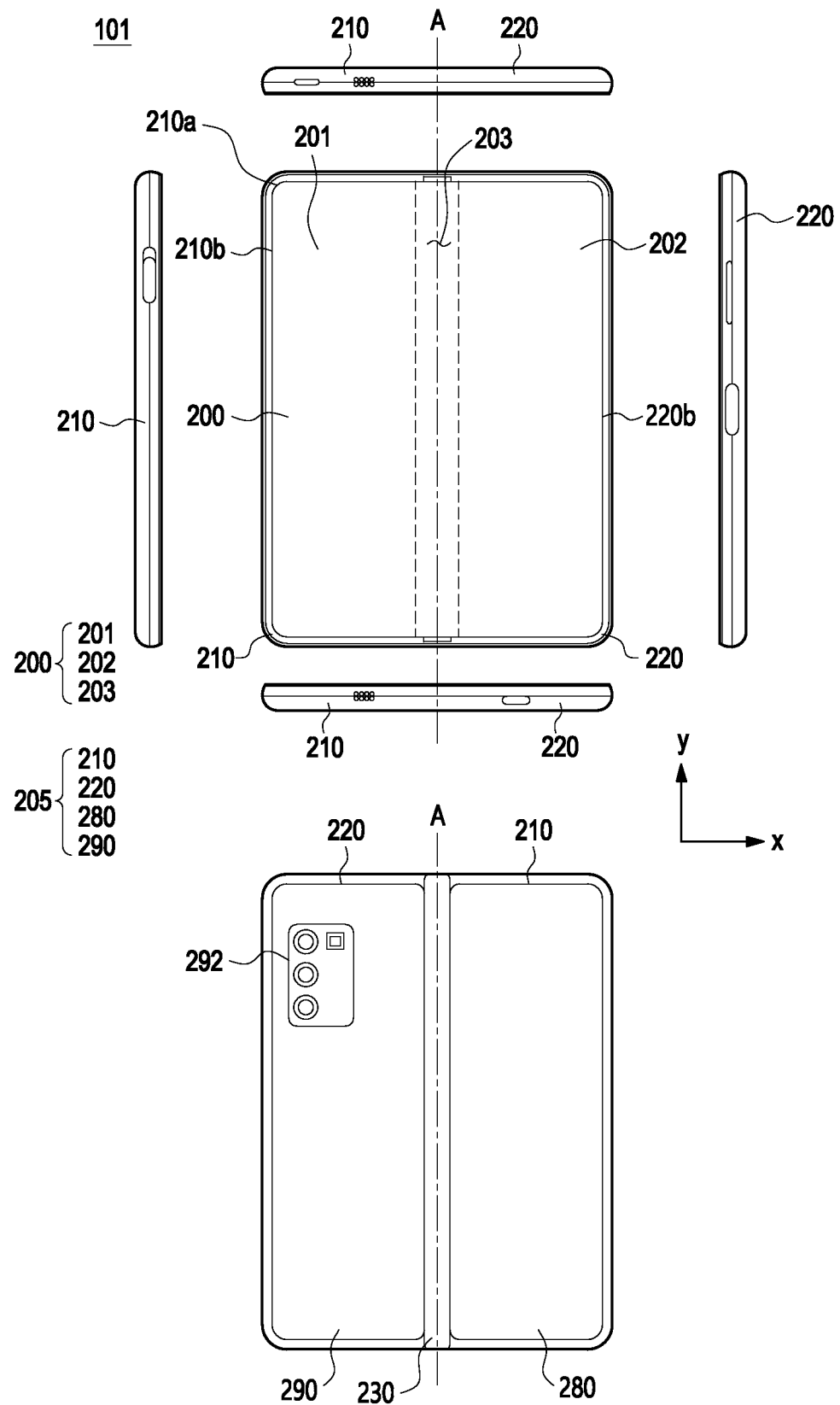
FIG. 2A is a view illustrating an unfolded state of an electronic device according to various embodiments.
Figure 2B:
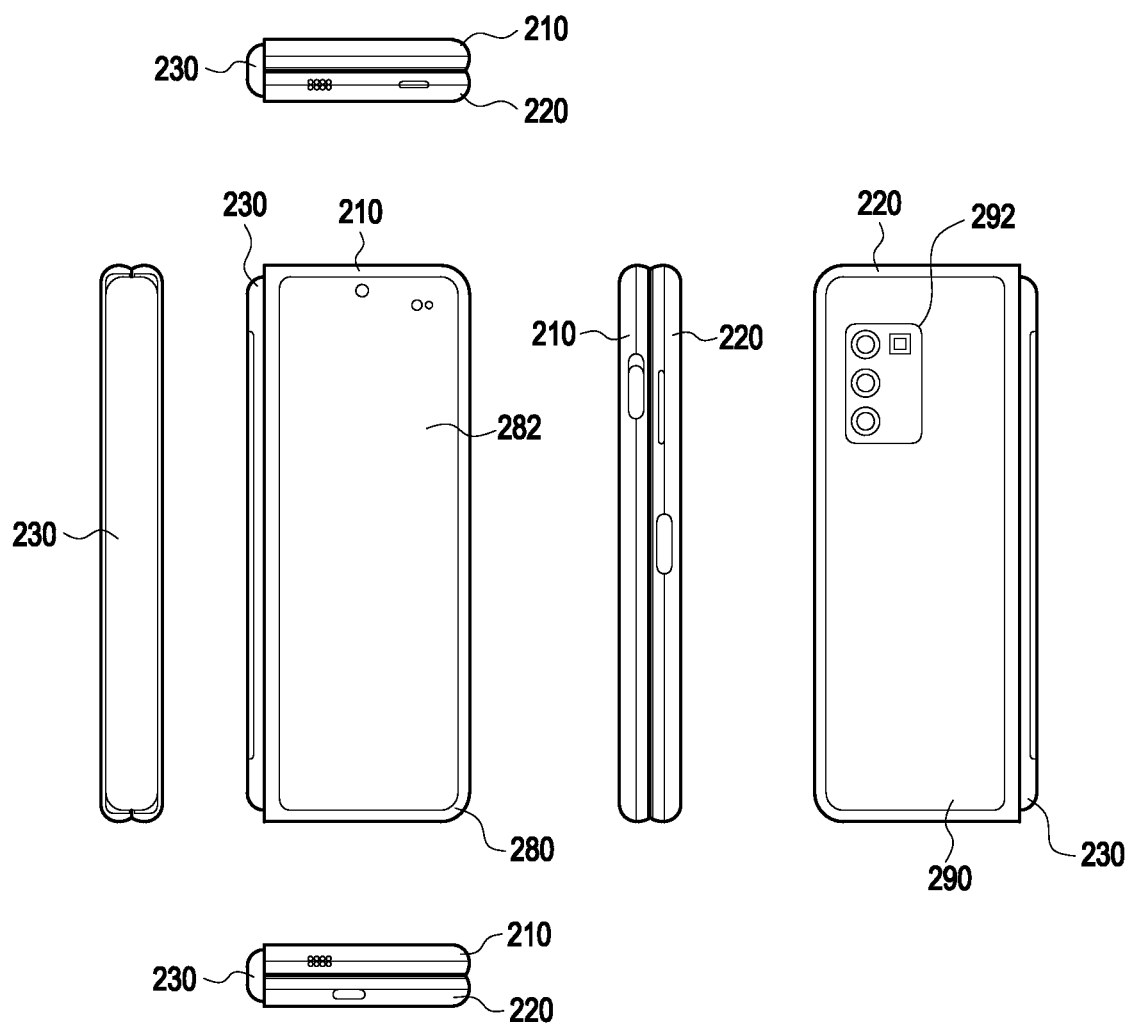
FIG. 2B is a view illustrating a folded state of an electronic device according to various embodiments.

FIG. 2A is a view illustrating an unfolded state of an electronic device according to various embodiments. FIG. 2B is a view illustrating a folded state of an electronic device according to various embodiments.

Referring to FIGS. 2A and 2B, an electronic device 101 may include a foldable housing 205, a hinge cover 230 covering a foldable portion of the foldable housing, and a flexible or foldable display 200 (hereinafter, simply "display 200") (e.g., the display module 160 of FIG. 1) disposed in a space formed by the foldable housing 200. In the disclosure, a surface where the display 200 is disposed is defined as a first surface or a front surface of the electronic device 101. The opposite surface of the front surface is defined as a second surface or a rear surface of the electronic device 101. The surface surrounding the space between the front and rear surfaces is defined as a third surface or a side surface of the electronic device 101.

According to various embodiments, the foldable housing 205 may include a first housing structure 210, a second housing structure 220, a first rear cover 280, and a second rear cover 290. The foldable housing 205 of the electronic device 101 are not limited to the shape and coupling shown in FIGS. 2A and 2B but may rather be implemented in other shapes or via a combination and/or coupling of other components. For example, according to various embodiments, in the foldable housing 205, the first housing structure 210 and the first rear cover 280 may be integrally formed with each other, and the second housing structure 220 and the second rear cover 290 may be integrally formed with each other.

According to various embodiments, the first housing structure 210 and the second housing structure 220 may be positioned on opposite sides of a folding axis (axis A), and they may be overall symmetrical in shape with each other with respect to the folding axis A. The first housing structure 210 and the second housing structure 220 may have different angles or distances formed therebetween depending on whether the electronic device 101 is in an unfolded, folded, or intermediate state. The first housing structure 210 and the second housing structure 220 may have shapes symmetrical with each other.

According to various embodiments, at least a portion of the first housing structure 210 and the second housing structure 220 may be formed of a metal or a non-metal material having a predetermined degree of rigidity to support the display 200.

According to various embodiments, the first rear cover 280 may be disposed on one side of the folding axis A on the rear surface of the electronic device 101 and have, e.g., a substantially rectangular periphery which may be surrounded by the first housing structure 210. Similarly, the second rear cover 290 may be disposed on the opposite side of the folding axis on the rear surface of the electronic device 101 and its periphery may be surrounded by the second housing structure 520.

According to various embodiments, the first rear cover 280 and the second rear cover 290 may be substantially symmetrical in shape with respect to the folding axis (axis A). However, the first rear cover 280 and the second rear cover 290 are not necessarily symmetrical in shape. The electronic device 101 may include the first rear cover 280 and the second rear cover 290 in various shapes. According to various embodiments, the first rear cover 280 may be integrally formed with the first housing structure 210, and the second rear cover 290 may be integrally formed with the second housing structure 220.

According to various embodiments, a combined structure of the first rear cover 280, the second rear cover 290, the first housing structure 210, and the second housing structure 220 may form a space where various components (e.g., a printed circuit board or battery) of the electronic device 101 may be disposed. According to various embodiments, one or more components may be arranged or visually exposed on/through the rear surface of the electronic device 101. For example, the first rear cover 280 and/or the second rear cover 290 may include a sub display 282. Further, the first rear cover 280 and/or the second rear cover 290 may include a proximity sensor and/or a rear camera 292.

Referring to FIG. 2A, the hinge cover 230 may be disposed between the first housing structure 210 and the second housing structure 220 to hide the internal components, e.g., a hinge structure. For example, the hinge structure may be configured to be folded or unfolded inward or outward. According to various embodiments, the hinge cover 230 may be hidden by a portion of the first housing structure 210 and second housing structure 220 or be exposed to the outside depending on the state (e.g., flat state or folded state) of the electronic device 101.

According to various embodiments, the display 200 may be disposed in a space formed by the foldable housing 205. For example, the display 200 may be seated on a recess formed by the foldable housing 205 and may occupy most of the front surface of the electronic device 101.

According to various embodiments, the front surface of the electronic device 101 may include the display 200 and a partial area of the first housing structure 210 and a partial area of the second housing structure 220, which are adjacent to the display 200. The rear surface of the electronic device 101 may include the first rear cover 280, a partial area of the first housing structure 210, which is adjacent to the first rear cover 280, the second rear cover 290, and a partial area of the second housing structure 220, which is adjacent to the second rear cover 290.

According to various embodiments, the display 200 may mean a display at least a portion of which may be transformed into a flat or curved surface. In an embodiment, the display 200 may include a folding area 203, a first display area 201, which is disposed on one side of the folding area 203 (the left side of the folding area 203 of FIG. 2A), and a second display area 202 disposed on the other side (the right side of the folding area 203 of FIG. 2A).

Meanwhile, the segmentation of the display 200 as shown in FIG. 2A is merely an example, and the display 200 may be divided into a plurality of (e.g., four or more, or two) areas depending on the structure or function of the display 200. For example, in an embodiment, in the embodiment illustrated in FIG. 2A, the display 200 may be divided into the areas by the folding area 203 or folding axis (axis A) extending in parallel with the y axis but, in another embodiment, the display 200 may be divided into the areas with respect to another folding area (e.g., a folding area parallel with the x axis) or another folding axis (e.g., a folding axis parallel with the x axis).

The first display area 201 and the second display area 202 may be overall symmetrical in shape with respect to the folding area 203. However, although a partial area of the first display area 201 and/or the second display area 202 may include a notch cut according to the presence of a sensor, the first display area 201 and the second display area 202 may have shapes symmetrical with each other in the remaining area. In other words, the first display area 201 and the second display area 202 may include symmetrical portions and asymmetrical portions.

Described below are the operation of the first housing structure 210 and the second housing structure 220 and each area of the display 200 depending on the state (e.g., the unfolded state (flat state) and folded state) of the electronic device 101.

According to various embodiments, when the electronic device 101 is in the unfolded state (flat state) (e.g., FIG. 2A), the first housing structure 210 and the second housing structure 220 may be angled at 180 degrees therebetween, facing in the same direction. The surface of the first display area 201 and the surface of the second display area 202 of the display 101 may be angled at 180 degrees therebetween while facing in the same direction (e.g., forward of the front surface of the electronic device). The folding area 203 may form the same plane with the first display area 201 and the second display area 202.

According to various embodiments, when the electronic device 101 is in the folded state (e.g., FIG. 2B), the surface of the first display area 201 and the surface of the second display area 202 may face each other. The surface of the first display area 201 and the surface of the second display area 202 of the display 200 may be angled at a small angle (e.g., an angle between 0 degrees and 10 degrees) therefrom while facing each other. At least a portion of the folding area 203 may have a curved surface with a predetermined curvature.

According to various embodiments, the unfolded state of the electronic device 101 may mean a first state of the electronic device 101, and the folded state of the electronic device 101 may mean a second state of the electronic device 101.

According to various embodiments, referring to FIG. 2A, a state in which the center portion of the display 200 is unfolded so that the first housing structure 210 and the second housing structure 220 are continuously arranged may be the first state of the electronic device 101. Referring to FIG. 2B, a state in which the center portion of the display 200 is folded so that one surface of the first housing structure 210 and one surface of the second housing structure 220 are arranged to face in opposite directions may be the second state of the electronic device 101.

According to various embodiments, in the first state, the electronic device 101 may activate at least one area (e.g., the first display area 201 and/or the second display area 202) of the display 200. According to various embodiments, in the second state, the electronic device 101 may deactivate the display 200.

According to various embodiments, the display 200 may be prepared so that at least a portion thereof is bendable (or foldable). The display 200 may include a first display area 201 disposed on the first housing structure 210, a second display area 202 disposed on the second housing structure 220, and a folding area 203 within a predetermined range from where the first housing structure 210 and the second housing structure 220 abut. At least a portion of the folding area may be flexible.

According to various embodiments, the electronic device 101 may include a processor 120. The processor 120 may control the overall operation of the electronic device 101. Although it is described below that the electronic device 101 performs the following operations, at least some of the operations performed by the electronic device 101 may be controlled by the processor 120.

Various embodiments may be applied to electronic devices with a general display, as well as the electronic device 101 including the foldable display 200. Further, various embodiments may be applied to electronic devices including a rollable display.

Figure 3:
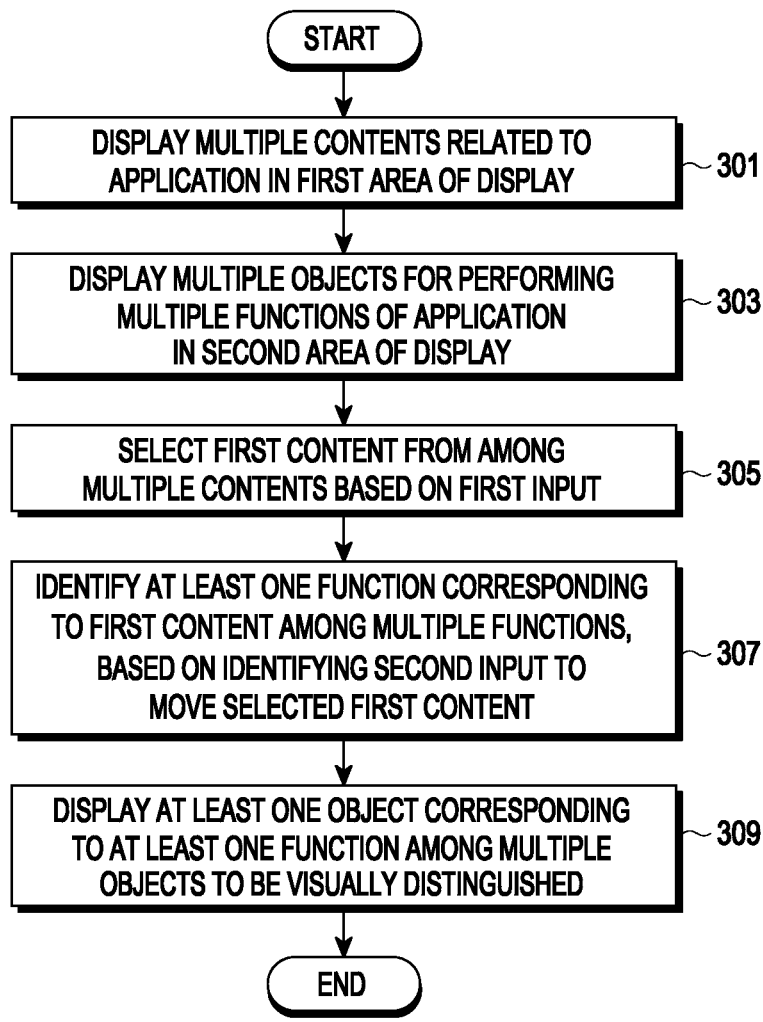
FIG. 3 is a flowchart illustrating a method for operating an electronic device according to various embodiments.

FIG. 3 is a flowchart illustrating a method for operating an electronic device according to various embodiments.

Referring to FIG. 3, according to various embodiments, the electronic device 101 may execute an application stored in the memory 130. For example, the electronic device 101 may store a plurality of applications in the memory 130. The electronic device 101 may execute at least one application among the plurality of applications.

According to various embodiments, in operation 301, the electronic device 101 may display a plurality of contents related to the application executed in a first area of the display 200. For example, the first area of the display 200 may be an area in which an execution screen of the application is displayed. The plurality of contents may be included in the execution screen of the application.

According to various embodiments, in operation 303, the electronic device 101 may display a plurality of objects for performing a plurality of functions of the application in the second area of the display 200. For example, the second area may be an area in which a navigation bar (e.g., a navigation rail) or a window (e.g., a popup window) including a plurality of objects is displayed. For example, the second area may be an area different from the first area. For example, the second area may be disposed next to the application execution screen. Or, the second area may overlap a partial area of the first area or may be a partial area of the first area. For example, the second area may be disposed in a left end or lower end of the application execution screen. For example, each of the plurality of objects may include an icon indicating a corresponding function.

According to various embodiments, in operation 305, the electronic device 101 may select a first content from among a plurality of contents based on the user's first input. For example, the first input may be a tap and hold input touched on the first content. For example, the electronic device 101 may highlight and display the selected first content to indicate the selection.

According to various embodiments, in operation 307, after the first content is selected, the electronic device 101 may identify at least one function corresponding to the first content among the plurality of functions of the application based on identifying a second input to move the selected first content. For example, the second input may be a drag input touched on the first content. Further, the first input and the second input may be a single continuous touch gesture on the first content. For example, the first content may be selected based on a start point of one touch gesture on the electronic device 101, and the first content may be moved based on the movement of the touch corresponding to the one touch gesture. If a drag input to the first content is identified, the electronic device 101 may identify at least one function that may be executed for the first content (or corresponding to the first content) among the plurality of functions provided by the application. Further, the electronic device 101 may previously store information about what type (e.g., kind or property) of content may be supported by each of the plurality of functions provided by the application or information about whether a specific type of content is performed or may be received in the function provided by the application (or application type). For example, if the first content is selected, the electronic device 101 may identify the type of the first content using the pre-stored information and determine the function capable of performing or receiving the corresponding type of content. Or, if the first content is selected, the electronic device 101 may identify the type of the first content and determine the function capable of performing or receiving the corresponding type of content using an AI service (or AI function) and/or information obtained from an external server (e.g., information about what type of content may be supported by each of the plurality of functions). Meanwhile, the electronic device 101 may select and move the first content by a second input without the operation of selecting the first content through the first input.

According to various embodiments, in operation 309, the electronic device 101 may display at least one object corresponding to at least one function among the plurality of objects to be visually distinguished from the other objects. For example, if a movement of the first content is identified by the second input, the electronic device 101 may display at least one object corresponding to at least one function among the plurality of objects to be visually distinguished from at least one other object. For example, the electronic device 101 may dim or blur the other objects than at least one object among the plurality of objects. Further, the electronic device 101 may highlight and display at least one object by changing the color, brightness, and/or line thickness. If the first content is moved near the second area (or inside of the second area) by the second input, the electronic device 101 may enlarge a size of the second area in which the plurality of objects are displayed. Further, the electronic device 101 may display sub objects of the plurality of objects in the enlarged second area.

According to various embodiments, the electronic device 101 may highlight and display the first object by changing the color, brightness, and/or line thickness of the first object based on the movement of the first content to the first object, among at least one object, through the second input (e.g., drag input). If the second input (e.g., drag input) is released on the first object, the electronic device 101 may perform the function indicated by the first object for the first content.

According to various embodiments, the electronic device 101 may select a plurality of contents based on a plurality of first inputs. The electronic device 101 may move the plurality of contents selected through the second input. If the second input (e.g., drag input) is released (e.g., drag released) on the first object, the electronic device 101 may perform the function indicated by the first object for the plurality of contents.

Figure 4:
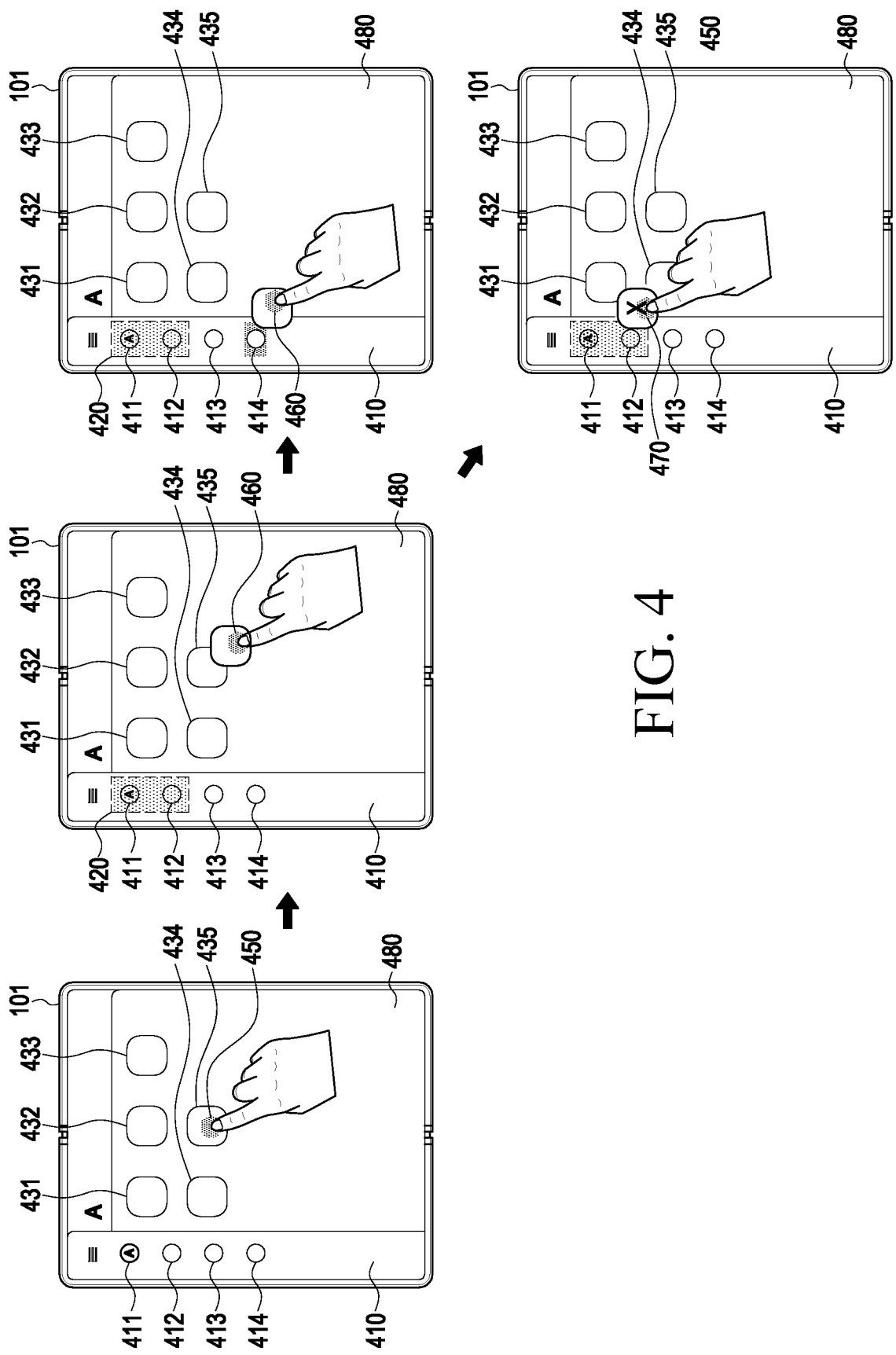
FIG. 4 is a view illustrating a user interface provided by an electronic device according to various embodiments.

FIG. 4 is a view illustrating a user interface provided by an electronic device according to various embodiments.

Referring to FIG. 4, according to various embodiments, the electronic device 101 may execute an application. The electronic device 101 may display a plurality of contents 431 to 435 related to the application (or application execution screen) executed in the first area 480 of the display 200. The electronic device 101 may display a plurality of objects 411 to 414 for performing a plurality of functions of the application in the second area 410 of the display 200. For example, the second area may be implemented in the form of a navigation bar (or navigation rail).

According to various embodiments, in operation 305, the electronic device 101 may select a first content 435 from among a plurality of contents 431 to 435 based on the user's first input 450. For example, the first input 450 may be a tap and hold input to the first content 435.

According to various embodiments, after the first content 435 is selected, the electronic device 101 may identify at least one function corresponding to the first content 435 among the plurality of functions of the application based on identifying a second input 460 (e.g., drag input) to move the first content 435. The electronic device 101 may dim or blur the other objects 411 and 412 other than at least one object 413 and 414 corresponding to at least one function among the plurality of objects 411 to 414 based on identifying the second input 460.

According to various embodiments, the electronic device 101 may highlight and display the first object 414 by changing the color, brightness, and/or line thickness of the first object 414 based on the movement of the first content near the first object 414 (or over the first object 414) by the second input 460. Or, the electronic device 101 may highlight and display the first object 414 by changing the color or brightness of the external area of the first object 414.

According to various embodiments, if the second input 460 is released (e.g., drag released) on the first object 414, the electronic device 101 may perform the function indicated by the first object 414 for the first content 435.

According to various embodiments, if the first content is moved to the objects 411 or 412 other than at least one object 413 and 434 among the plurality of objects 411 to 414 by the second input 460, the electronic device 101 may display a notification 470 indicating non-executable. For example, the electronic device 101 may display a notification 470 indicating non-executable in the first content moved by the second input 460.

Figure 5:
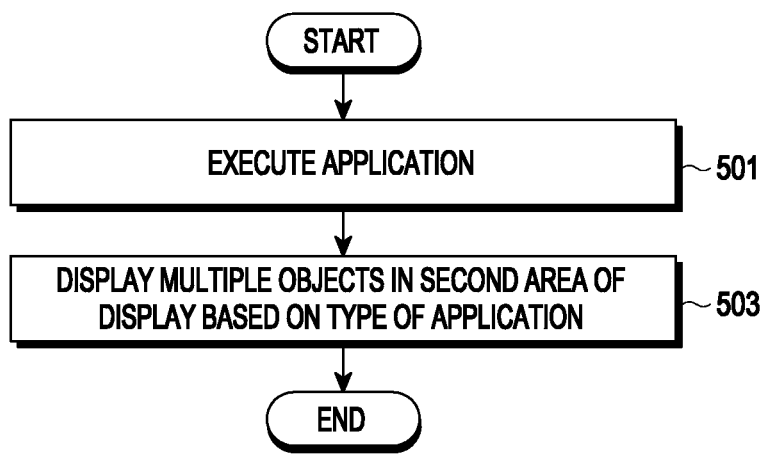
FIG. 5 is a flowchart illustrating an operation of displaying a plurality of objects based on a kind of an application by an electronic device according to various embodiments.

FIG. 5 is a flowchart illustrating an operation of displaying a plurality of objects based on a kind of an application by an electronic device according to various embodiments.

Referring to FIG. 5, in operation 501, the electronic device 101 may execute at least one application among a plurality of applications stored in the memory 130. The electronic device 101 may display an execution screen of at least one application on the display 200.

According to various embodiments, in operation 503, the electronic device 101 may display a plurality of objects in the second area of the display 200 based on the type of the application. For example, the electronic device 101 may determine objects to be displayed in the second area (e.g., a display area of a navigation bar or a navigation rail) of the display 200 depending on the type of the application executed. For example, the objects displayed in the second area of the display 200 may differ or at least some thereof may be identical depending on the type of the application executed. For example, if the first application is executed, the electronic device 101 may display the objects indicating the functions of the first application in the second area of the display. Further, if a second application different from the first application is executed, the electronic device 101 may display objects indicating the functions of the second application in the second area of the display.

According to various embodiments, when the first application and the second application are simultaneously executed, the electronic device 101 may display objects indicating the functions of the first application in one area (e.g., an area next to the execution screen of the first application) of the display 200 and display objects indicating the functions of the second application in another area (e.g., an area next to the execution screen of the second application) of the display 200.

FIGS. 6A, 6B, 6C and 6D are views illustrating a user interface provided by an electronic device according to various embodiments.

Referring to FIGS. 6A to 6D, according to various embodiments, the electronic device 101 may display an execution screen 680 of an application in a first area of the display 200. The application execution screen 680 may include a plurality of contents 631 to 635 of the application.

According to various embodiments, the electronic device 101 may display a navigation bar (or navigation rail) 610 in the second area of the display 200. The navigation bar 610 may include a plurality of objects 611 to 614 indicating the functions provided by the application.

Figure 6A:
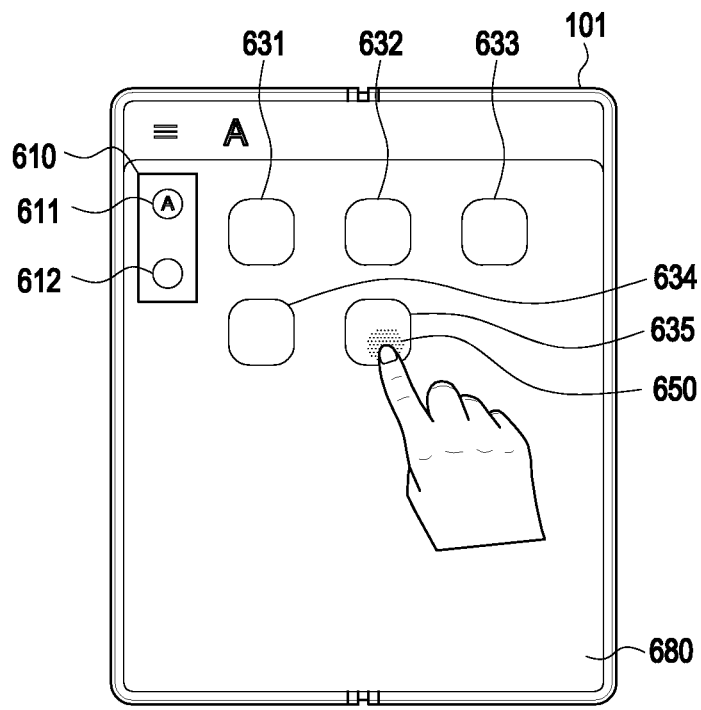
FIGS. 6A, 6B, 6C and 6D are views illustrating a user interface provided by an electronic device according to various embodiments.

Referring to FIG. 6A, according to various embodiments, the electronic device 101 may display the navigation bar 610 including the plurality of objects 611 to 612 on the application execution screen 680 including the plurality of contents 631 to 635. For example, the navigation bar 610 may not display all of the plurality of objects according to the displayed size. The electronic device 101 may select the first content 635 based on a first input (e.g., a tap and hold input) 650 touched by the user.

Figure 6B:
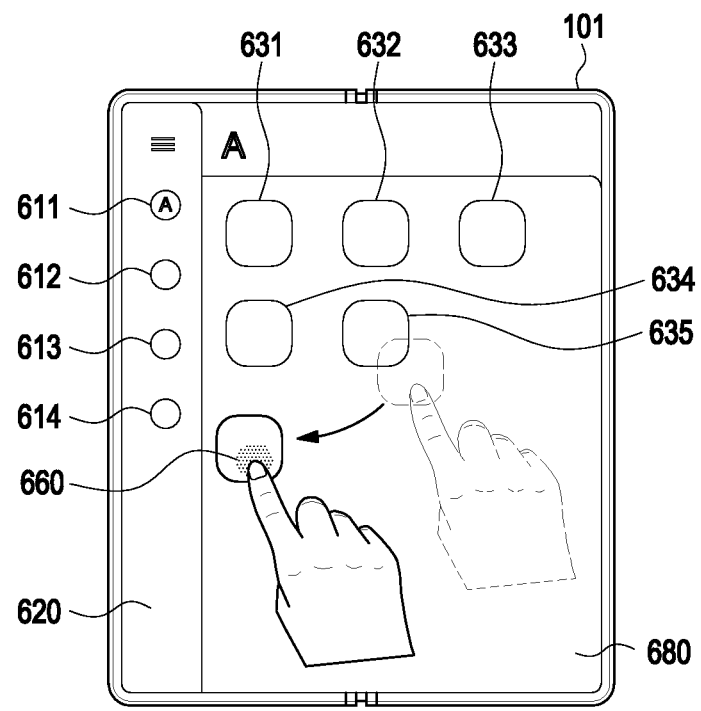

Referring to FIG. 6B, according to various embodiments, the electronic device 101 may enlarge the navigation bar 610 based on identifying a second input 660 (e.g., drag input) to move the first content 635 near the navigation bar 610 after the first content 635 is selected. For example, the electronic device 101 may enlarge the navigation bar 610 downward. The electronic device 101 may display a plurality of objects 611 to 614 corresponding to the functions provided by the application, in the enlarged navigation bar 620.

According to various embodiments, the electronic device 101 may identify at least one function corresponding to the first content 635 among the plurality of functions of the application based on identifying a second input 660 (e.g., drag input) to move the first content 635. Although not shown in FIG. 6B, the electronic device 101 may dim and display the other objects than at least one object corresponding to at least one function among the plurality of objects 611 to 614 based on identifying a second input 460.

Figure 6C:
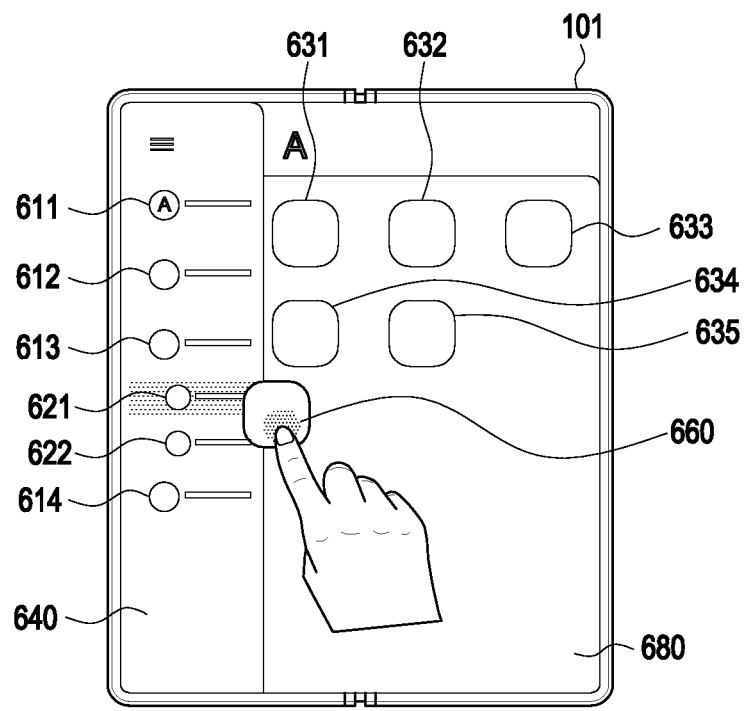

Referring to FIG. 6C, according to various embodiments, at least some of the plurality of objects may include at least one sub object. For example, the sub object may indicate a detailed function of the function indicated by the corresponding object. For example, when the function of the application is a function to move a file to a specific folder, the sub object may mean a function of moving the file to a sub folder of the corresponding folder.

According to various embodiments, when at least some of the plurality of objects include the sub object, the electronic device 101 may further enlarge the navigation bar 620 based on the second input 660. For example, the electronic device 101 may enlarge the navigation bar 620 to the right. The electronic device 101 may further display a plurality of sub objects (e.g., a first sub object 621 and a second sub object 622) corresponding to the detailed function provided by the application, in the enlarged navigation bar 640.

Figure 6D:
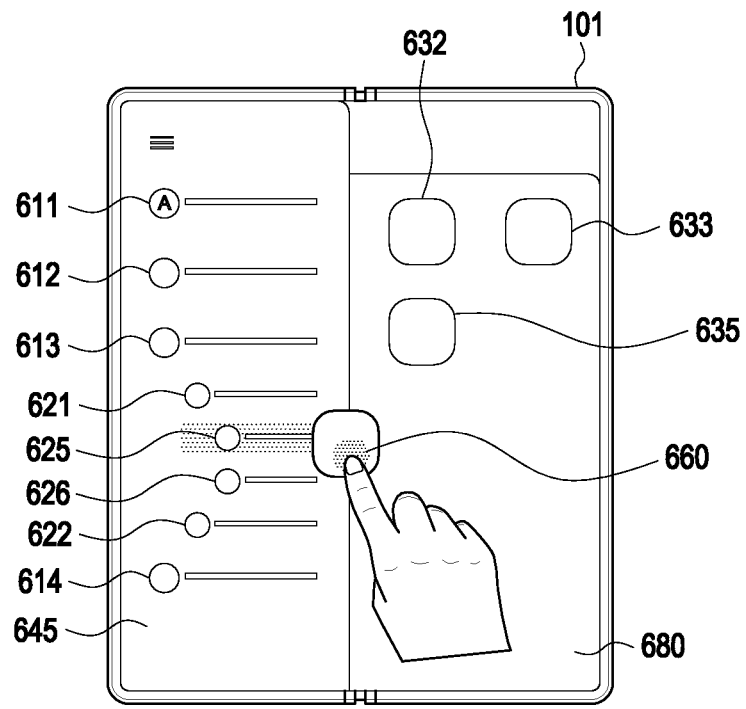

Referring to FIG. 6D, according to various embodiments, if the first sub object 621 further includes an additional sub object, the electronic device 101 may further enlarge the navigation bar 640 based on the second input 660. For example, the electronic device 101 may further enlarge the navigation bar 620 to the right. The electronic device 101 may further display a plurality of additional sub objects (e.g., sub objects 625 and 626 of the first sub object 621) corresponding to the additional detailed function provided by the application, in the enlarged navigation bar 645.

According to various embodiments, the electronic device 101 may highlight the first additional sub object 625 by changing the color, brightness, and/or line thickness of the first additional sub object 625 of the first sub object 621 or changing the color or brightness of the external area of the first additional sub object 625 based on the second input 660.

According to various embodiments, if the second input 460 is released (e.g., drag released) on the first additional sub object 625, the electronic device 101 may perform the function indicated by the first additional sub object 625 for the first content 635. For example, the electronic device 101 may move the first content 635 to the folder indicated by the first additional sub object 625.

FIGS. 7A, 7B, 7C and 7D are views illustrating a user interface provided by an electronic device according to various embodiments.

Referring to FIGS. 7A to 7D, according to various embodiments, the electronic device 101 may display an execution screen 780 of an application in a first area of the display 200. The application execution screen 780 may include a plurality of contents of the application.

According to various embodiments, the electronic device 101 may display a navigation bar (or navigation rail) 710 in the second area of the display 200. The navigation bar 710 may include a preset area 715 and a customized area 716. For example, the preset area 715 may be an area in which the first content 760 may be dragged and dropped through the second input 760 only when permitted in the application. The customized area 716 may be an area in which the first content 735 may be dragged and dropped through the second input 760 without limitations.

Figure 7A:
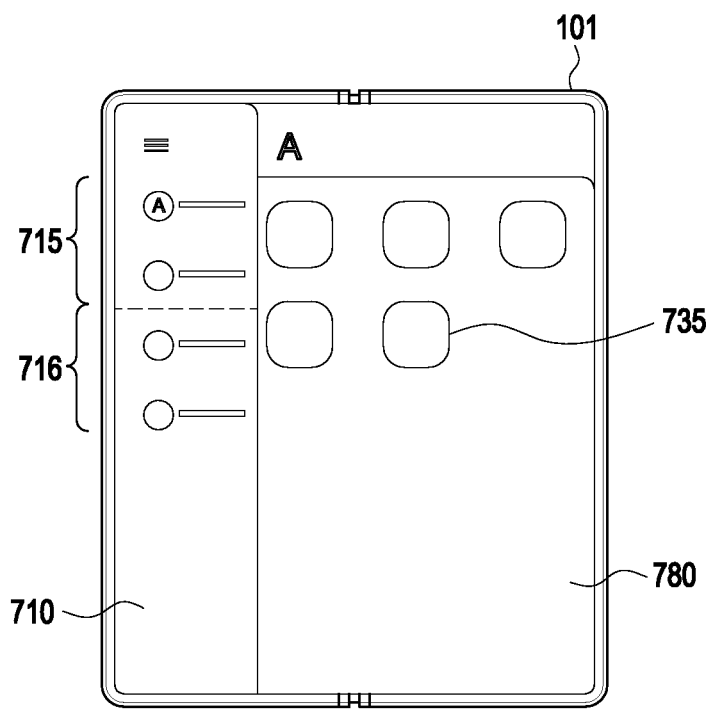
FIGS. 7A, 7B, 7C and 7D are views illustrating a user interface provided by an electronic device according to various embodiments.

Referring to FIG. 7A, according to various embodiments, the electronic device 101 may select the first content 735 based on the user's first input (e.g., touch-and-hold input).

Figure 7B:
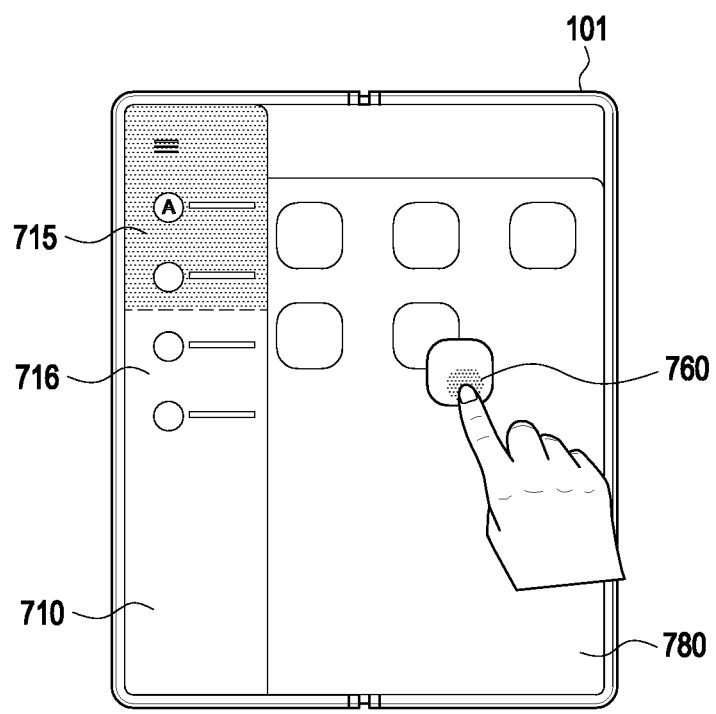

Referring to FIG. 7B, according to various embodiments, the electronic device 101 may move the first content 735 based on the user's second input 760 (e.g., drag input). If the second input to the first content 735 is identified, the electronic device 101 may dim and display the preset area 715.

Figure 7C:
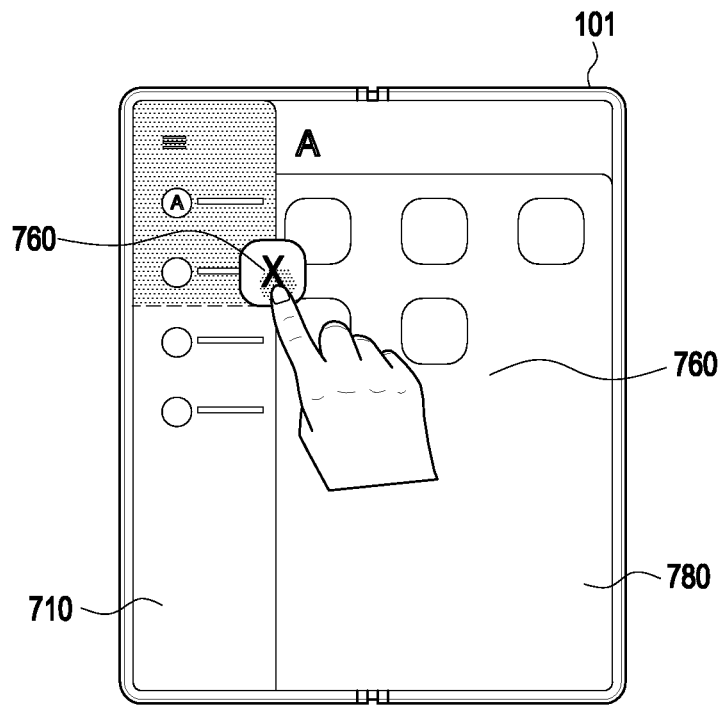

Referring to FIG. 7C, according to various embodiments, if the first content 735 is moved to the preset area 715 by the second input 760 (e.g., drag input), the electronic device 101 may display a notification indicating non-executable. For example, the electronic device 101 may display a notification indicating non-executable in the first content 735 moved by the second input 760. For example, the electronic device 101 may not move the first content 735 to the folder indicated by an object included in the preset area 715.

Figure 7D:
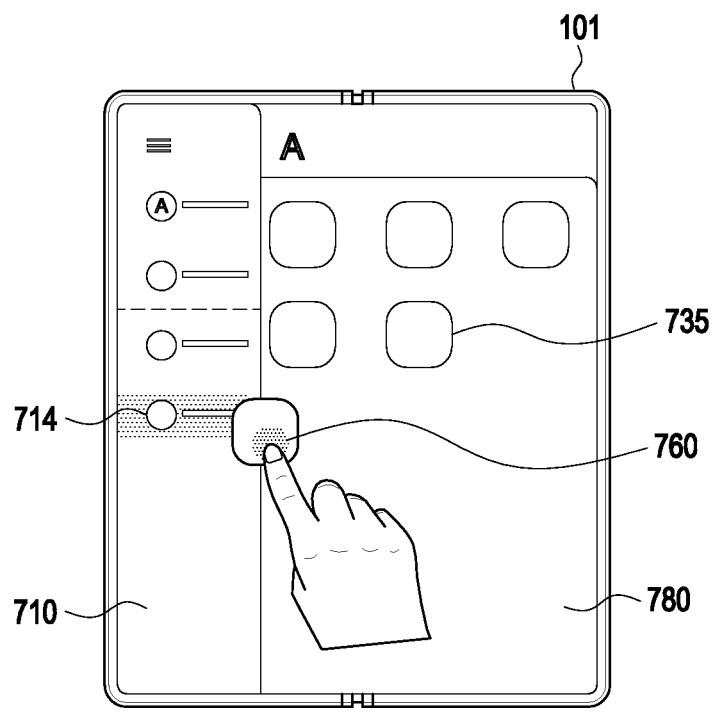

Referring to FIG. 7D, according to various embodiments, if the first content 735 is moved to the first object 714 included in the customized area 716 by the second input 760 (e.g., drag input), the electronic device 101 may highlight the first object 714. If the second input 760 is released (e.g., drag drop) on the first object 714, the electronic device 101 may perform the function indicated by the first object 714 for the first content 735. For example, the electronic device 101 may move the first content 735 to the folder indicated by the first object 714.

FIGS. 8A to 8G are views illustrating a user interface provided by an electronic device according to various embodiments.

Referring to FIGS. 8A, 8B, 8C, 8D, 8E, 8F and to 8G, according to various embodiments, the electronic device 101 may display an execution screen 880 of an application in a first area of the display 200. For example, the application may be a file manager application. The application execution screen 880 may include a plurality of contents of the application. For example, the plurality of contents may be icons indicating files stored in a first folder (folder A).

According to various embodiments, the electronic device 101 may display a navigation bar (or navigation rail) 810 in the second area of the display 200. The navigation bar 810 may include a plurality of objects based on the file manager application. For example, the navigation bar 810 may include a first object 811 indicating the first folder (folder A) and a second object 812 indicating a second folder (folder B).

Figure 8A:
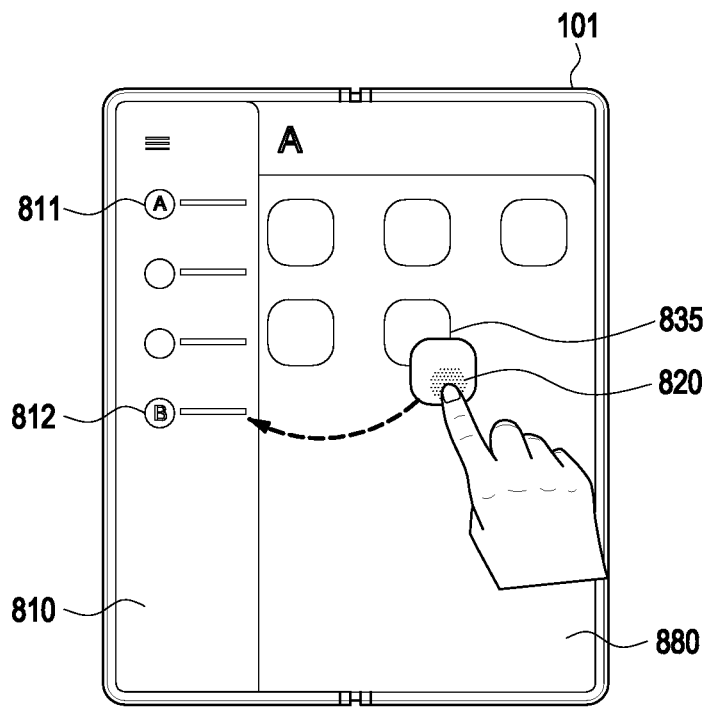
FIGS. 8A, 8B, 8C, 8D, 8E, 8F and 8G are views illustrating a user interface provided by an electronic device according to various embodiments.

Referring to FIG. 8A, according to various embodiments, after the first content 835 is selected from among the plurality of contents, the electronic device 101 may identify at least one object corresponding to the first content 835 among the plurality of objects included in the navigation bar 810 based on identifying a second input 820 (e.g., drag input) to move the first content 835. For example, the electronic device 101 may dim and display the first object 811 to indicate that moving to the first folder (folder A) is impossible. Or, the electronic device 101 may highlight and display the second object 812 to indicate that moving to the second folder (folder B) is possible.

Figure 8B:
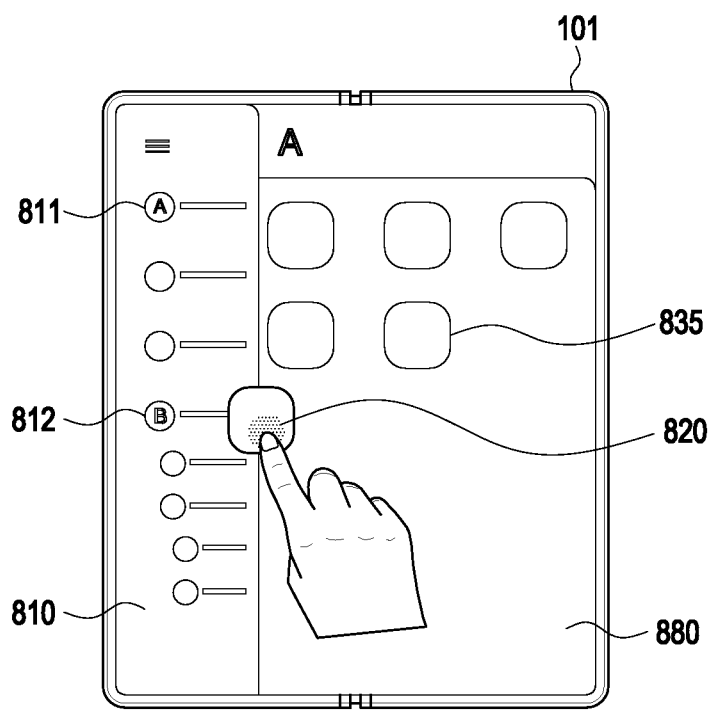

Referring to FIG. 8B, according to various embodiments, if the first content 835 is moved to the second object 812 according to the second input 820, the electronic device 101 may display sub objects of the second object 812 on the navigation bar 810.

Figure 8C:
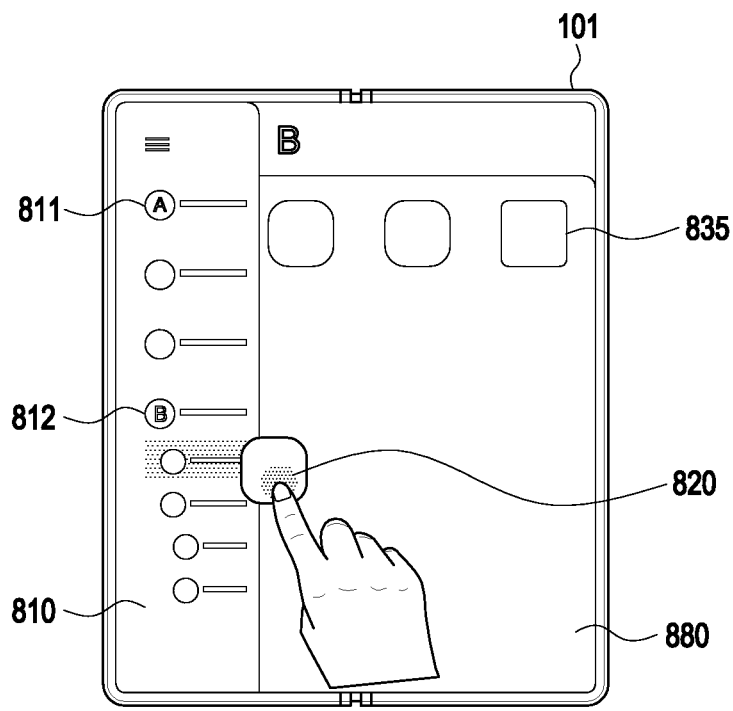

Referring to FIG. 8C, according to various embodiments, if the first content 820 is moved to the first sub object 820 according to the second input 820, the electronic device 101 may highlight and display the first sub object 820. If the second input 820 is released (e.g., drag drop) on the first sub object 820, the electronic device 101 may move the first content to the folder indicated by the first sub object 820. The electronic device 101 may display icons indicating the files stored in the second folder (folder B) in the first area of the display 200. In other words, the electronic device 101 may display the first content 835 along with the icons of the files previously stored in the sub folder corresponding to the first sub object 820 of the second folder (folder B).

Figure 8D:
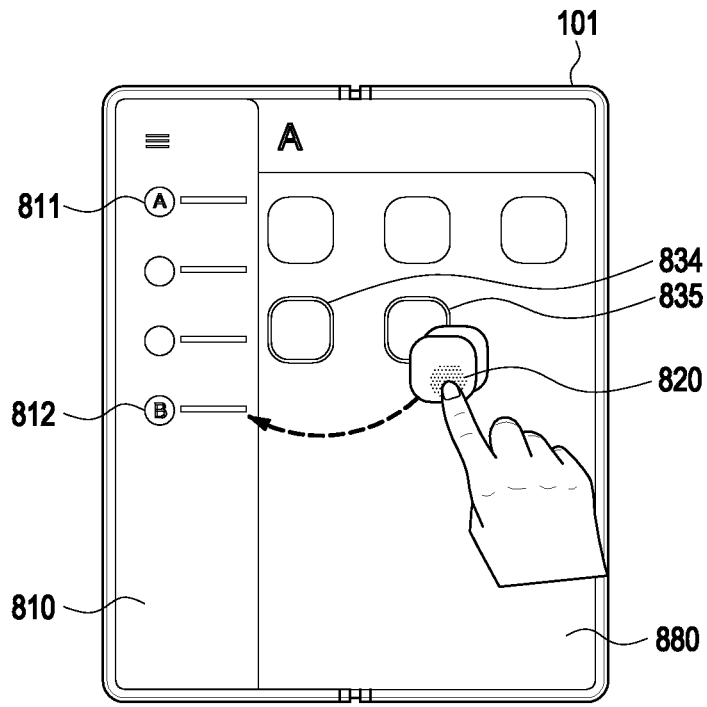
Figure 8E:
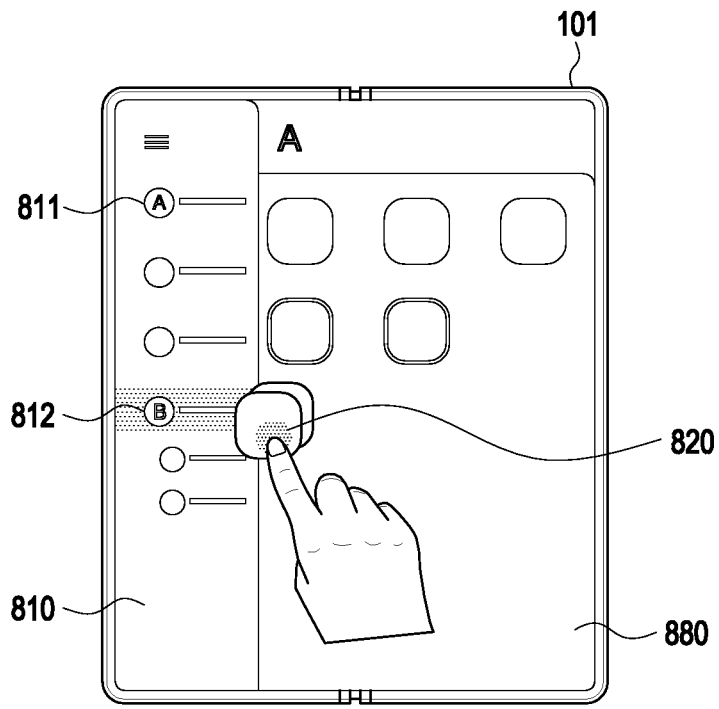

Referring to FIG. 8D, according to various embodiments, the electronic device 101 may select a plurality of contents including the first content 835. The electronic device 101 may identify at least one object corresponding to a plurality of contents among the plurality of objects included in the navigation bar 810 based on identifying the second input 820 (e.g., drag input) to move the plurality of contents after the plurality of contents are selected. For example, the electronic device 101 may dim and display the first object 811 to indicate that moving to the first folder (folder A) is impossible. Or, the electronic device 101 may highlight and display the second object 812 to indicate that moving to the second folder (folder B) is possible.

Figure 8F:
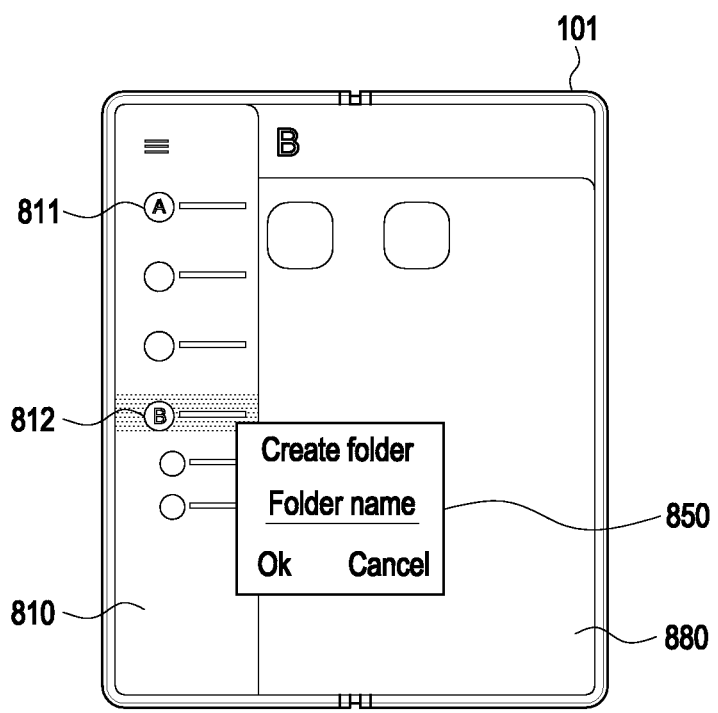

Referring to FIG. 8F, according to various embodiments, if a plurality of contents are moved to the second object 812 according to the second input 820, the electronic device 101 may highlight and display the second object 812. If the second input 820 is released (e.g., drag drop) on the second object 812, the electronic device 101 may move the plurality of selected contents to the folder indicated by the second object 812. The electronic device 101 may display the plurality of contents moved along with the files stored in the second folder (folder B) in the first area of the display 200.

Referring to FIG. 8F, according to various embodiments, if the second input 820 is released (e.g., drag drop) on the second object 812, the electronic device 101 may display a window 850 to generate a folder for the plurality of contents. The electronic device 101 may generate the folder for the plurality of contents based on a user input to the window 850.

Figure 8G:
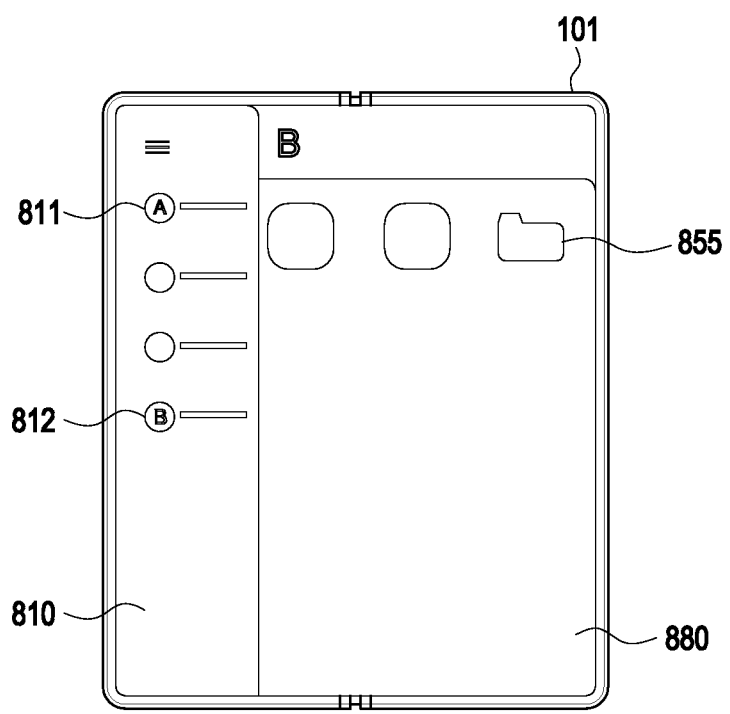

Referring to FIG. 8G, according to various embodiments, after the folder is generated, the electronic device 101 may move the folder 855, storing the plurality of contents, to the second folder (folder B) indicated by the second object 812. The electronic device 101 may display the folder 855 including the plurality of contents moved along with the files stored in the second folder (folder B) in the first area of the display 200.

FIGS. 9A, 9B, 9C, 9D and 9E are views illustrating a user interface provided by an electronic device according to various embodiments.

Figure 9A:
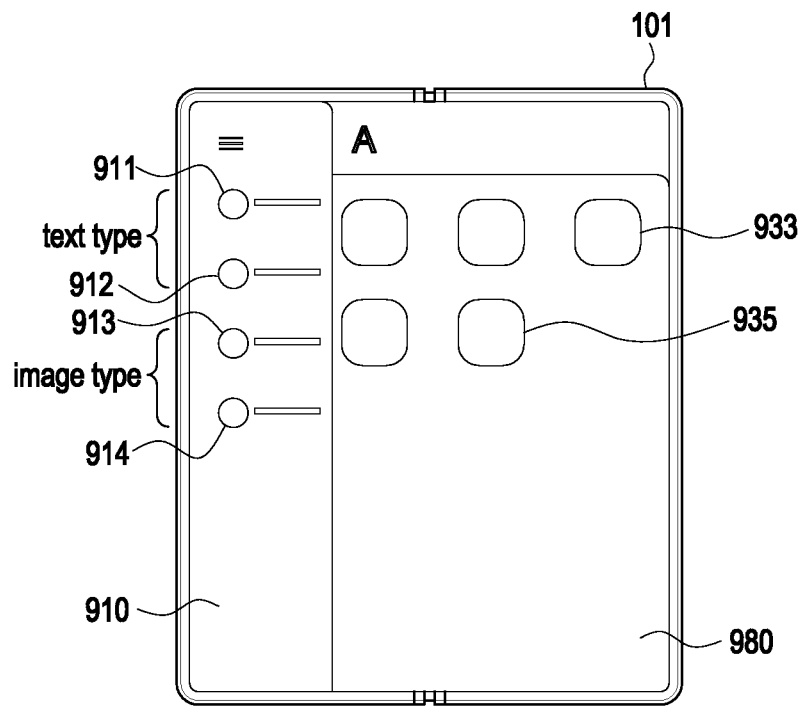
FIGS. 9A, 9B, 9C, 9D and 9E are views illustrating a user interface provided by an electronic device according to various embodiments.

Referring to FIG. 9A, according to various embodiments, the electronic device 101 may display an execution screen 980 of an application in a first area of the display 200. For example, the application may be a file manager application. The application execution screen 980 may include a plurality of contents of the application. For example, the plurality of contents may be icons indicating files stored in a first folder (folder A).

According to various embodiments, the electronic device 101 may display a navigation bar (or navigation rail) 910 in the second area of the display 200. The navigation bar 910 may include a plurality of objects based on the file manager application. For example, the navigation bar 810 may include a first object 911 and a second object 912 for executing functions for a text type and a third object 913 and a fourth object 914 for executing functions for an image type.

Referring to FIG. 9A, according to various embodiments, the electronic device 101 may select the first content 935 or the second content 933 from among a plurality of contents based on a first input (e.g., a touch-and-hold input). For example, the first content 935 may be an image type of content (e.g., an image file or video file). The second content 933 may be a text type of content (e.g., a text file or email file).

Figure 9B:
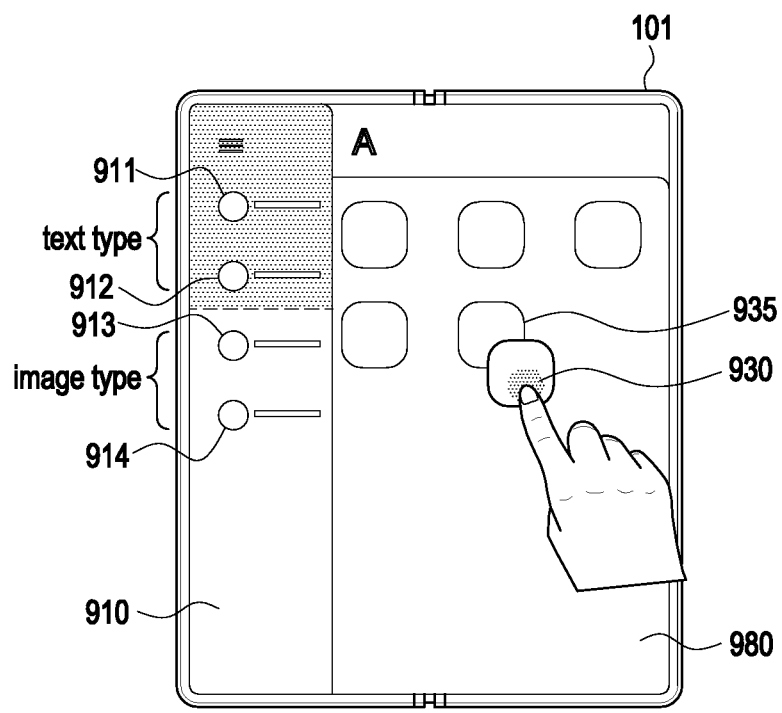

Referring to FIG. 9B, according to various embodiments, after the first content 935 is selected, the electronic device 101 may identify at least one object corresponding to the first content 935 among the plurality of objects 911 to 914 included in the navigation bar 910 based on identifying a second input 930 (e.g., drag input) to move the first content 935. For example, the electronic device 101 may dim and display the first object 911 and the second object 912 indicating functions for a text type. Or, the electronic device 101 may highlight and display the third object 913 and the fourth object 914 indicating functions for an image type. For example, the electronic device 101 may highlight and display any one object (e.g., the fourth object 914), preferred by the user of the third object 913 and the fourth object 914, by changing the color or line thickness. For example, the object indicating a function preferred by the user may be determined based on a use history or the user's setting.

Figure 9C:
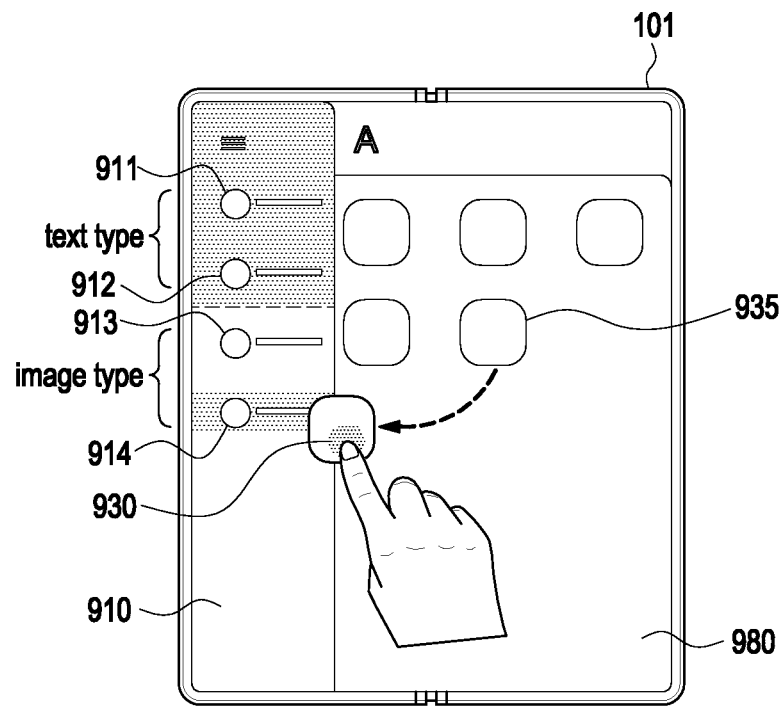

Referring to FIG. 9C, according to various embodiments, if the first content 935 is moved to the fourth object 914 according to the second input 930, the electronic device 101 may highlight and display the fourth object 914. If the second input 930 is released (e.g., drag drop) on the fourth object 914, the electronic device 101 may perform the function indicated by the fourth object 914 for the first content 935. For example, the electronic device 101 may display the image file indicated by the first content 935 through the application (e.g., a gallery application) indicated by the fourth object 914. Or, the electronic device 101 may edit the image file indicated by the first content 935 through an image edit application. According to various embodiments, if the first content 935 indicates a video file, the electronic device 101 may play the video through the application (e.g., a gallery application or video playback application) indicated by the fourth object 914.

Figure 9D:
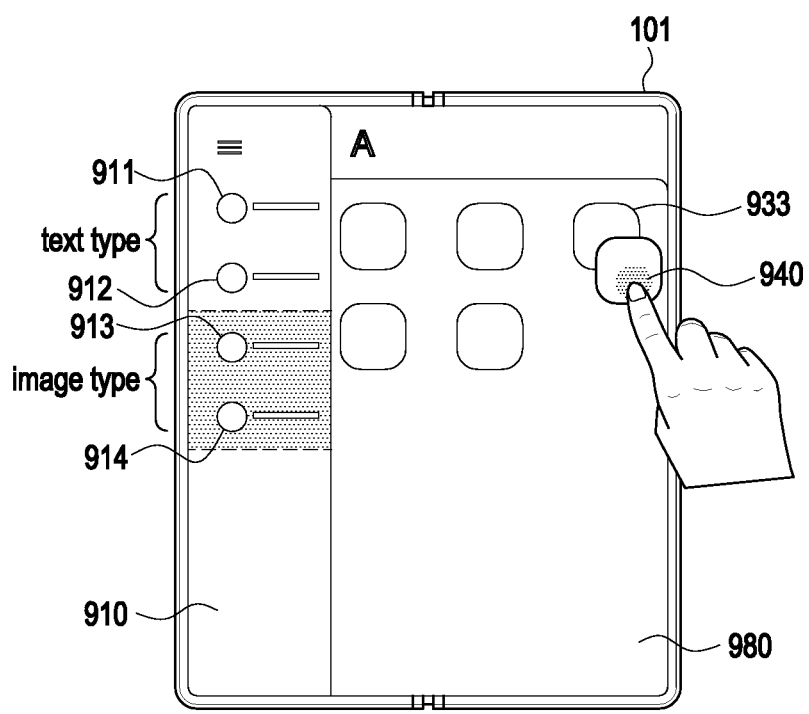

Referring to FIG. 9D, according to various embodiments, after the second content 933 is selected, the electronic device 101 may identify at least one object corresponding to the second content 933 among the plurality of objects 911 to 914 included in the navigation bar 910 based on identifying a second input 940 (e.g., drag input) to move the second content 933. For example, the electronic device 101 may blur and display the third object 913 and the fourth object 914 indicating functions for an image type. Or, the electronic device 101 may highlight and display the first object 911 and the second object 912 indicating functions for a text type. For example, the electronic device 101 may highlight and display any one object (e.g., the first object 911), preferred by the user of the first object 911 and the second object 912, by changing the color or line thickness. For example, the object indicating a function preferred by the user may be determined based on a use history or the user's setting.

Figure 9E:
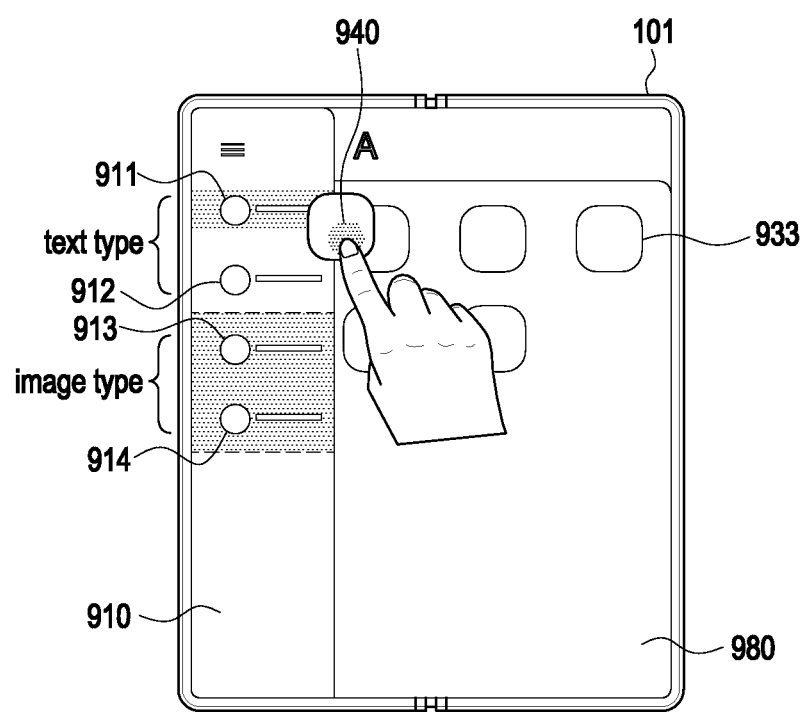

Referring to FIG. 9E, according to various embodiments, if the second content 933 is moved to the first object 911 according to the second input 940, the electronic device 101 may highlight and display the first object 911. If the second input 940 is released (e.g., drag drop) on the first object 911, the electronic device 101 may perform the function indicated by the first object 911 for the second content 933. For example, the electronic device 101 may display the text file indicated by the second content 933 through a document application. Or, the electronic device 101 may display the email file indicated by the second content 933 through an email application.

Figure 10A:
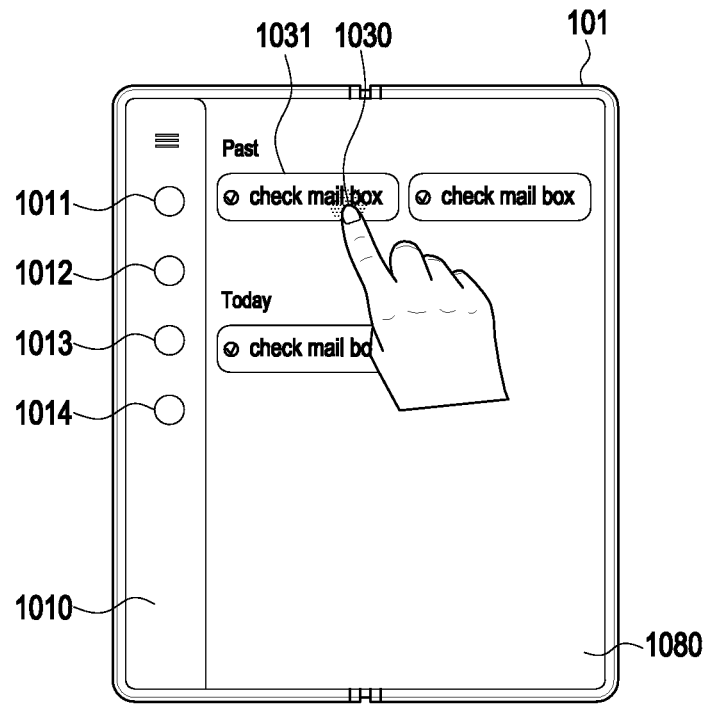
FIGS. 10A, 10B and 10C are views illustrating a user interface provided by an electronic device according to various embodiments.
Figure 10B:
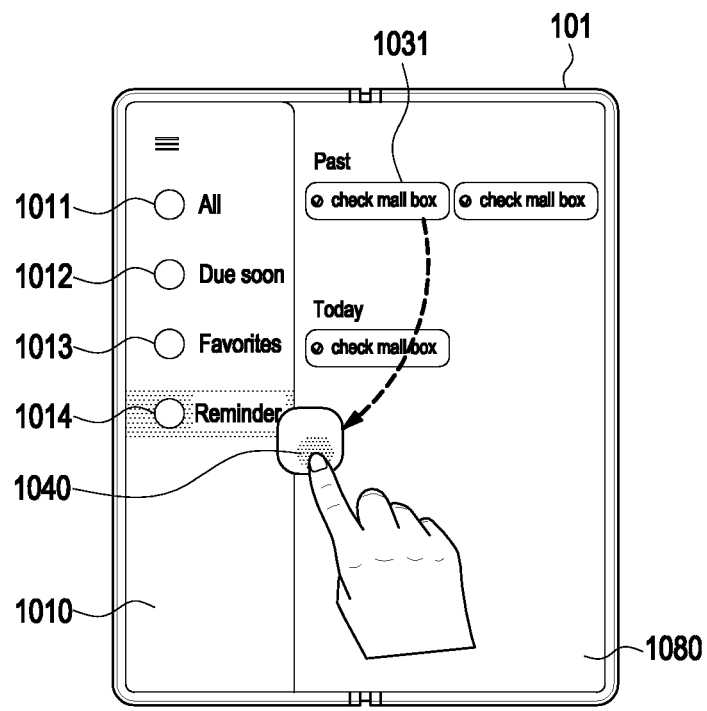
Figure 10C:
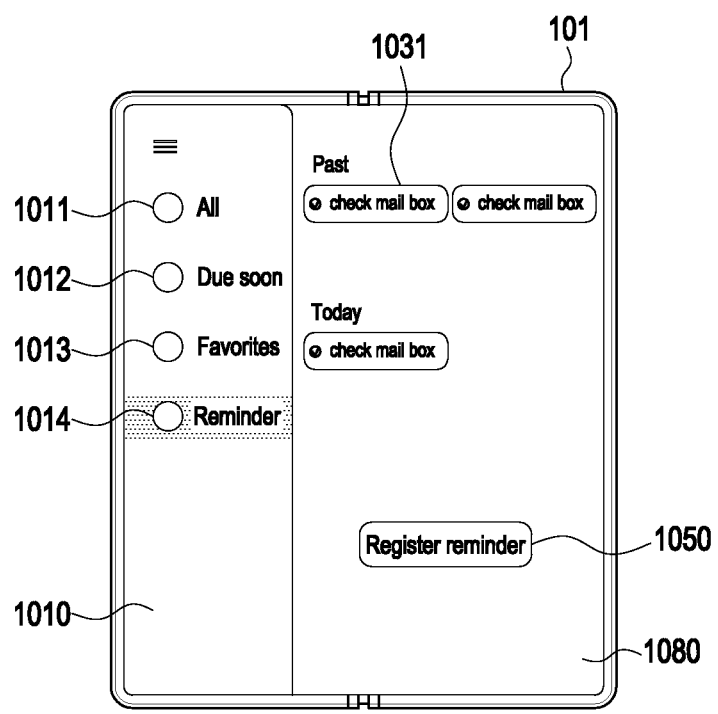

FIGS. 10A, 10B and 10C are views illustrating a user interface provided by an electronic device according to various embodiments.

Referring to FIG. 10A, according to various embodiments, the electronic device 101 may execute an indicator application. The electronic device 101 may display an execution screen 1080 of the indicator application in a first area. For example, the execution screen 1080 of the indicator application may include a plurality of contents.

According to various embodiments, the electronic device 101 may display a navigation bar (or navigation rail) 1010 in the second area of the display 200. The navigation bar 1010 may include a plurality of objects 1011 to 1014 indicating a plurality of functions provided by the indicator application.

According to various embodiments, the electronic device 101 may select a first content 1031 from among the plurality of contents based on a first input 1030 (e.g., a touch-and-hold input). For example, the first content 1031 may be a content to check a mailbox.

Referring to FIG. 10B, according to various embodiments, after the first content 1031 is selected, the electronic device 101 may identify at least one object corresponding to the first content 1031 among the plurality of objects 1011 to 1014 included in the navigation bar 1010 based on identifying a second input 1040 (e.g., drag input) to move the first content 1031. The electronic device 101 may display at least one object to be visually distinguished.

According to various embodiments, if the first content 1031 is moved to the first object 1014 (e.g., a reminder object) according to the second input 1040, the electronic device 101 may highlight and display the first object 1014.

Referring to FIG. 10C, according to various embodiments, if the second input 1040 is released (e.g., drag drop) on the first object 1014, the electronic device 101 may perform the function (e.g., a reminder function) indicated by the first object 1014 for the first content 1031. For example, the electronic device 101 may register the first content 1031 (check on mailbox) in a reminder category and display a notification window 1050.

Figure 11A:
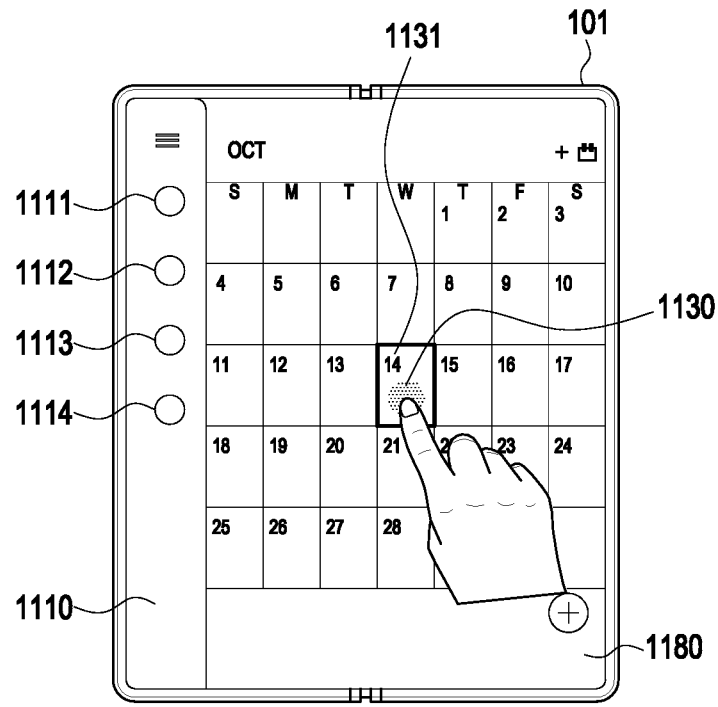
FIGS. 11A, 11B and 11C are views illustrating a user interface provided by an electronic device according to various embodiments.
Figure 11B:
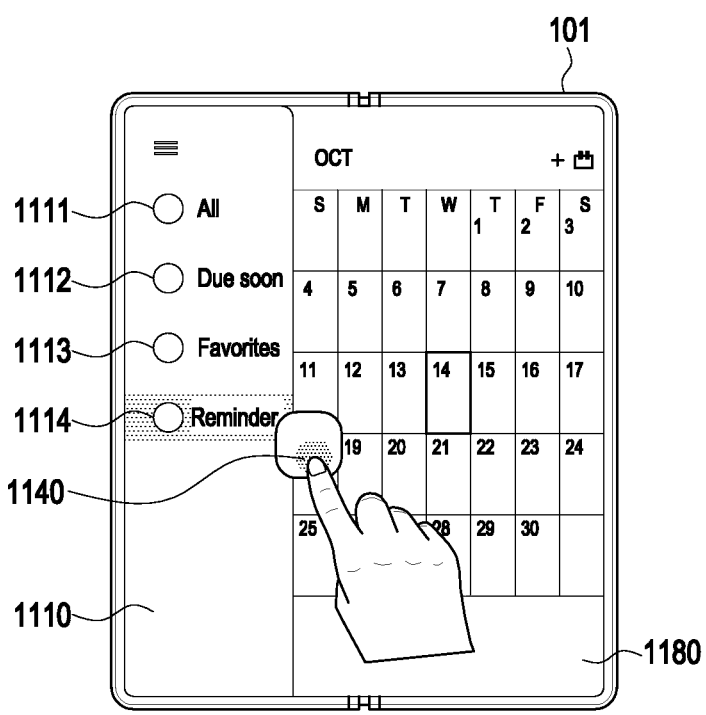
Figure 11C:
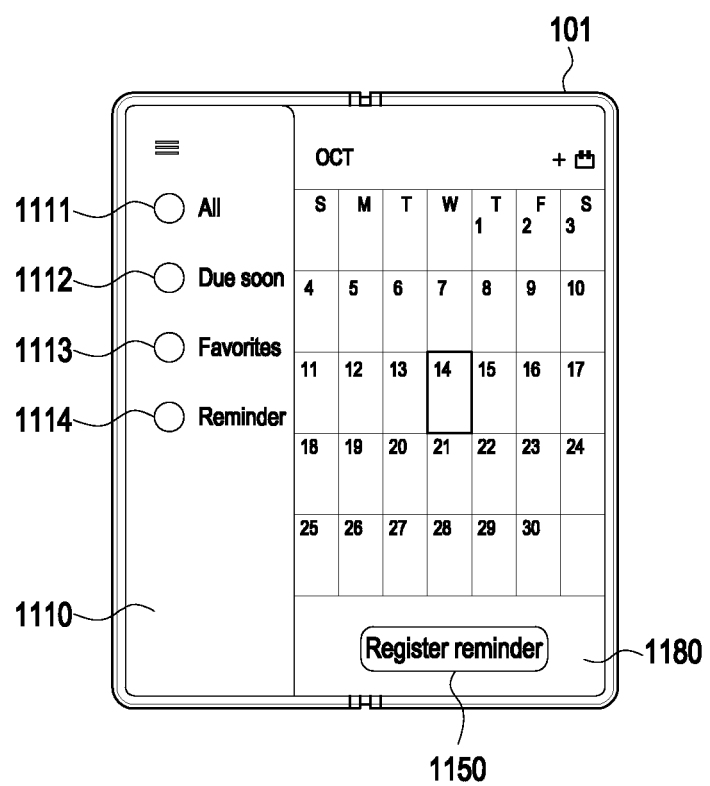

FIGS. 11A, 11B and 11C are views illustrating a user interface provided by an electronic device according to various embodiments.

Referring to FIG. 11A, according to various embodiments, the electronic device 101 may execute a calendar application. The electronic device 101 may display an execution screen 1180 of the calendar application in a first area. For example, the execution screen 1180 of the calendar application may include a plurality of contents (content indicating per-date schedules).

According to various embodiments, the electronic device 101 may display a navigation bar (or navigation rail) 1110 in the second area of the display 200. The navigation bar 1110 may include a plurality of objects 1111 to 1114 indicating a plurality of functions provided by the calendar application.

According to various embodiments, the electronic device 101 may select a first content 1131 from among the plurality of contents based on a first input 1130 (e.g., a touch-and-hold input). For example, the first content 1131 may be a content managing the schedule of a specific date.

Referring to FIG. 11B, according to various embodiments, the electronic device 101 may identify at least one object corresponding to the first content 1131 among the plurality of objects 1111 to 1114 included in the navigation bar 1110 based on identifying a second input 1140 (e.g., drag input) to move the selected first content 1131. The electronic device 101 may display at least one object to be visually distinguished.

According to various embodiments, if the first content 1131 is moved to the first object 1114 (e.g., a reminder object) according to the second input 1140, the electronic device 101 may highlight and display the first object 1114.

Referring to FIG. 11C, according to various embodiments, if the second input 1140 is released (e.g., drag drop) on the first object 1114, the electronic device 101 may perform the function (e.g., a reminder function) indicated by the first object 1114 for the first content 1131. For example, the electronic device 101 may register the first content 1131 (schedule of a specific date) in a reminder category and display a notification window 1150.

Figure 12A:
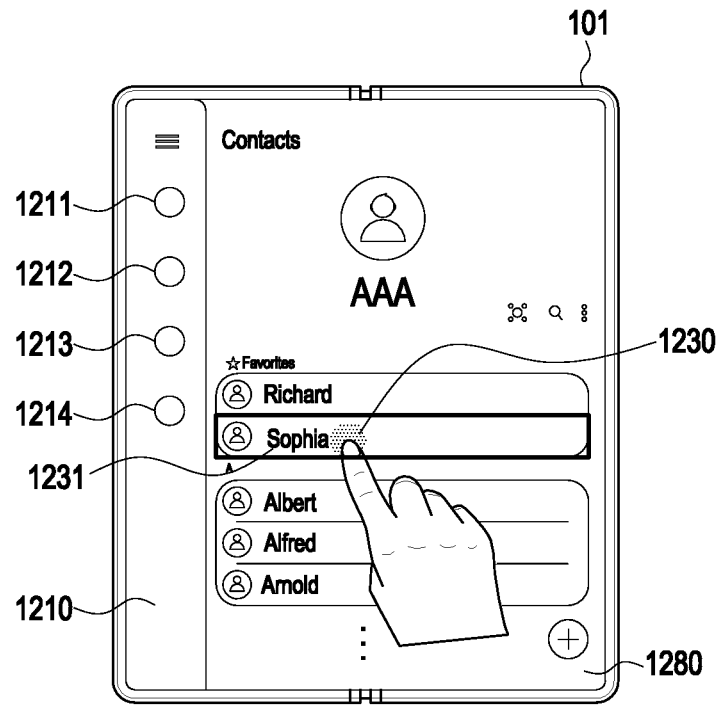
FIGS. 12A, 12B and 12C are views illustrating a user interface provided by an electronic device according to various embodiments.
Figure 12B:
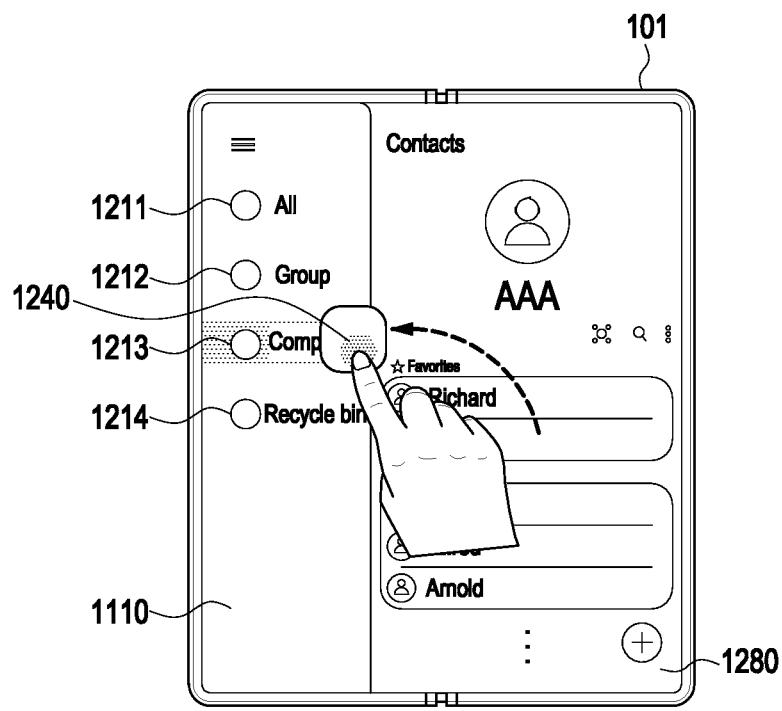
Figure 12C:
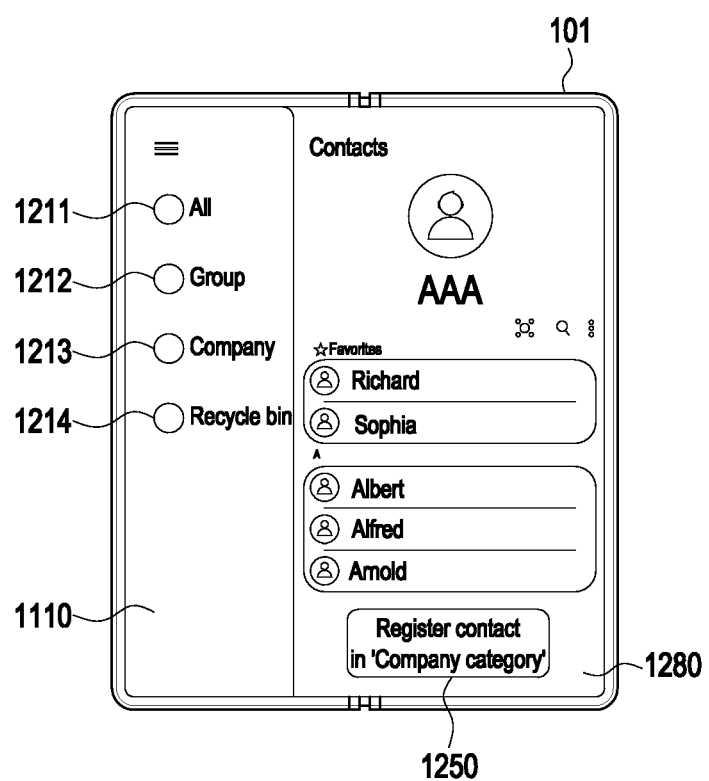

FIGS. 12A, 12B and 12C are views illustrating a user interface provided by an electronic device according to various embodiments.

Referring to FIG. 12A, according to various embodiments, the electronic device 101 may execute a contacts application. The electronic device 101 may display an execution screen 1280 of the contacts application in a first area. For example, the execution screen 1280 of the contacts application may include a plurality of contents (contacts information stored in the memory 130).

According to various embodiments, the electronic device 101 may display a navigation bar (or navigation rail) 1210 in the second area of the display 200. The navigation bar 1210 may include a plurality of objects 1211 to 1214 indicating a plurality of functions provided by the contacts application.

According to various embodiments, the electronic device 101 may select a first content 1231 from among the plurality of contents based on a first input 1230 (e.g., a touch-and-hold input). For example, the first content 1231 may include content contacts information about a specific person (e.g., Sophia).

Referring to FIG. 12B, according to various embodiments, the electronic device 101 may identify at least one object corresponding to the first content 1231 among the plurality of objects 1211 to 1214 included in the navigation bar 1210 based on identifying a second input 1240 (e.g., drag input) to move the selected first content 1231. The electronic device 101 may display at least one object to be visually distinguished.

According to various embodiments, if the first content 1231 is moved to the first object 1213 (e.g., company category) according to a second input 1240, the electronic device 101 may highlight and display the first object 1213.

Referring to FIG. 12C, according to various embodiments, if the second input 1240 is released (e.g., drag drop) on the first object 1213, the electronic device 101 may perform the function (e.g., registration in company category) indicated by the first object 1213 for the first content 1231. For example, the electronic device 101 may register the first content 1231 (contacts information about Sophia) in the company category and display a notification window 1250.

FIGS. 13A, 13B, 13C, 13D, 13E and 13F are views illustrating a user interface provided by an electronic device according to various embodiments.

Figure 13A:
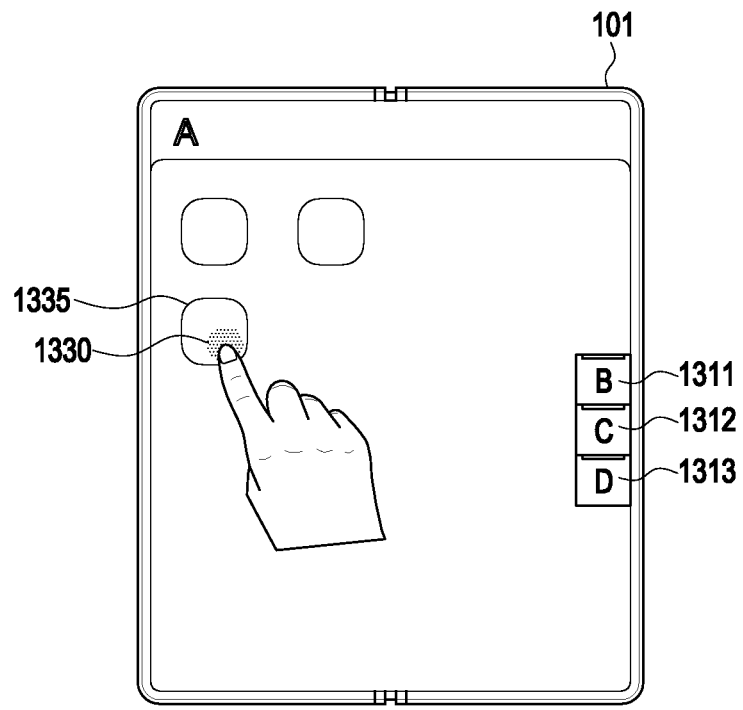
FIGS. 13A, 13B, 13C, 13D, 13E and 13F are views illustrating a user interface provided by an electronic device according to various embodiments.

Referring to FIG. 13A, according to various embodiments, the electronic device 101 may display a plurality of contents of an application in a first area of the display 200. The electronic device 101 may select a first content 1335 from among the plurality of contents based on a first input 1230 (e.g., a touch-and-hold input).

According to various embodiments, the electronic device 101 may display popup windows 1311 to 1313, instead of a navigation bar (or navigation rail), in the second area of the display 200. For example, the popup windows 1311 to 1313 may provide functions or information related to an application. Or, the popup windows 1311 to 1313 may include an execution screen of a separate application.

Figure 13B:
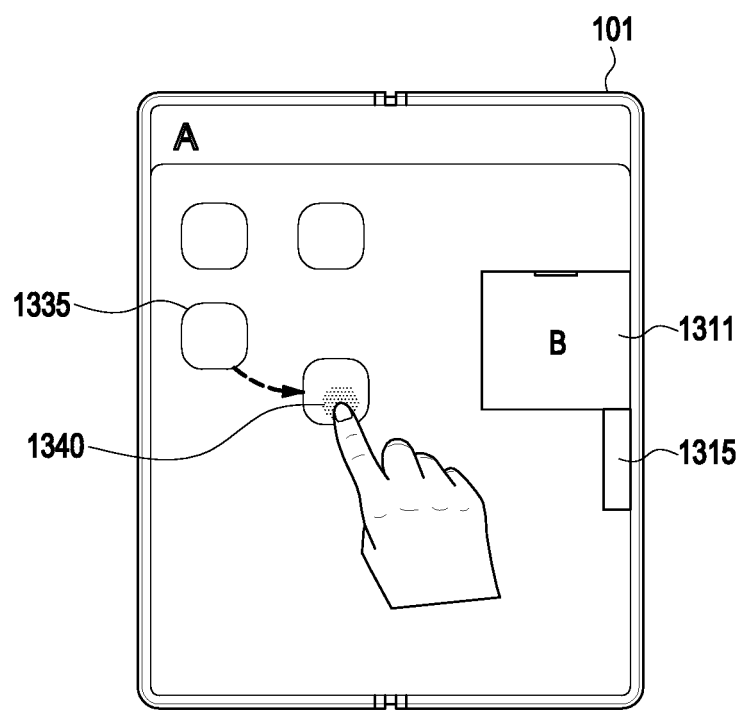

Referring to FIG. 13B, according to various embodiments, the electronic device 101 may display a first popup window 1311 related to the first content 1335 among the plurality of popup windows 1311 to 1313 to be visually distinguished, based on identifying a second input 1340 (e.g., drag input) to move the selected first content 1335. For example, the electronic device 101 may display the first popup window 1311 to be larger than the other popup windows 1312 and 1313 while displaying the other popup windows 1312 and 1313 to be smaller (e.g., display the two windows as one small window 1315).

Figure 13C:
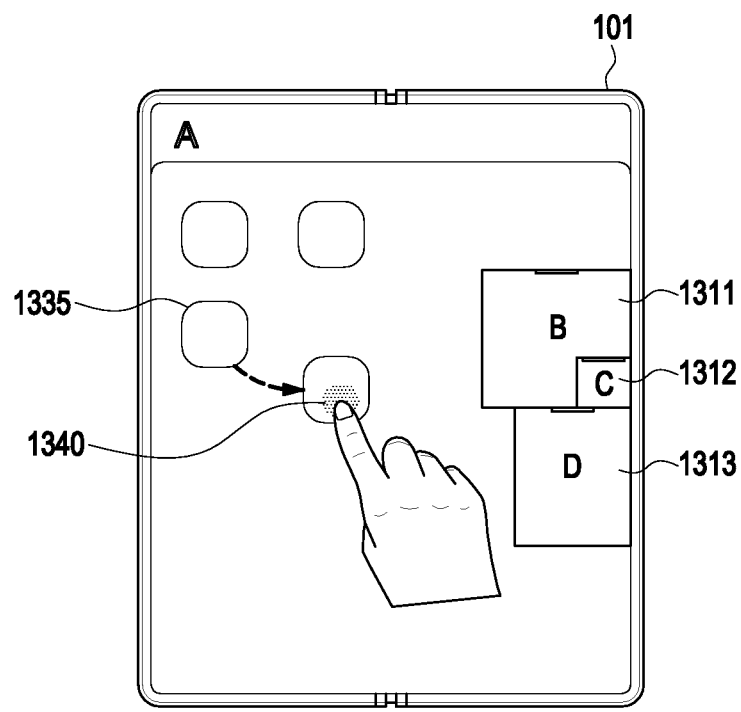

Referring to FIG. 13C, according to various embodiments, when there are several popup windows related to the first content 1335, the electronic device 101 may display the first popup window 1311 and third popup window 1313 related to the first content 1335 in a large size. In this case, the electronic device 101 may display the second popup window 1312 not related to the first content 1335 in a small size.

Figure 13D:
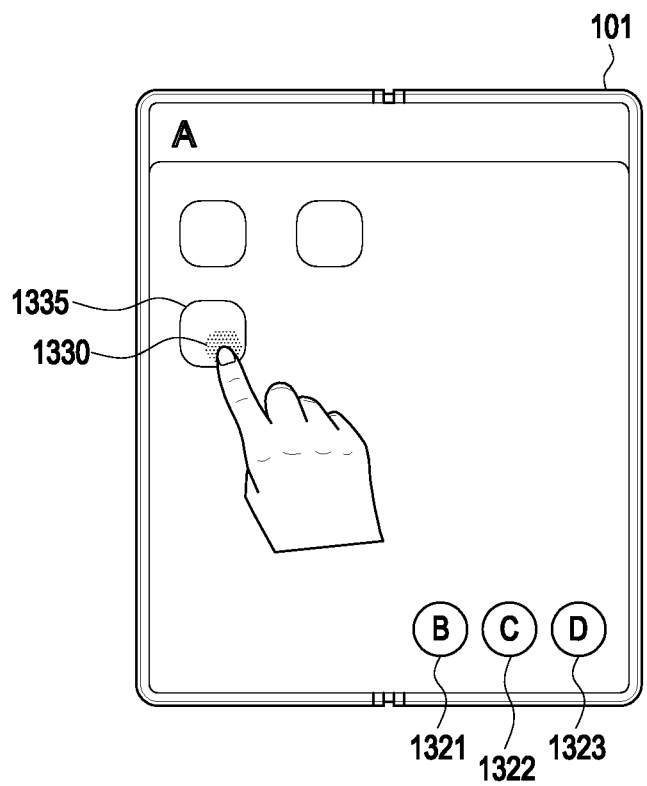

Referring to FIG. 13D, according to various embodiments, the electronic device 101 may display floating icons 1321 to 1323 instead of a navigation bar or popup windows in the second area of the display 200. For example, the floating icons 1311 to 1313 may provide functions or information related to an application.

Figure 13E:
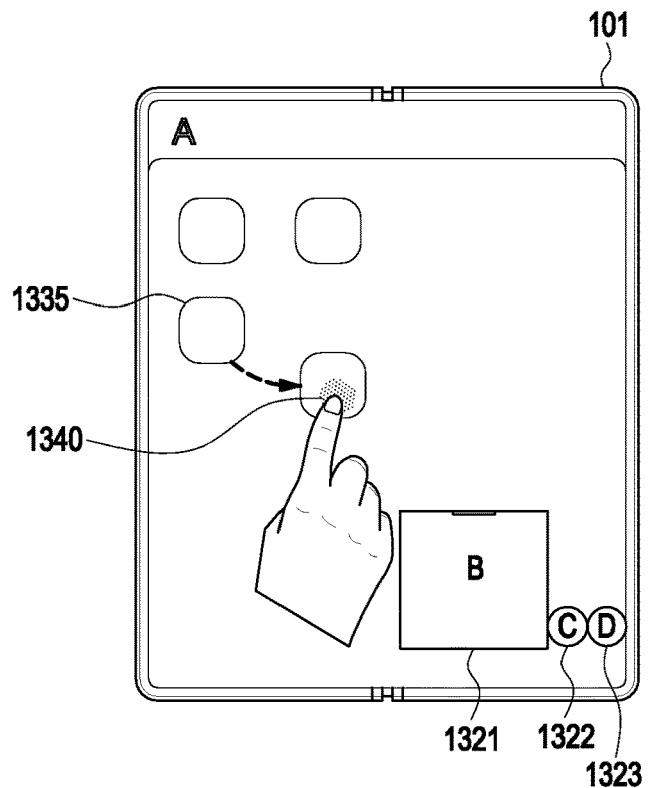

Referring to FIG. 13E, according to various embodiments, the electronic device 101 may display the first floating icon 1321 related to the first content 1335 among the plurality of floating icons 1321 to 1323 to be visually distinguished, based on identifying a second input 1240 (e.g., drag input) to move the first content 1335 selected by the first input 1330. For example, the electronic device 101 may display the first floating icon 1321 to be larger than the other floating icons 1322 and 1323 and display the first floating icon 1321 to be smaller then the other floating icons 1322 and 1323.

Figure 13F:
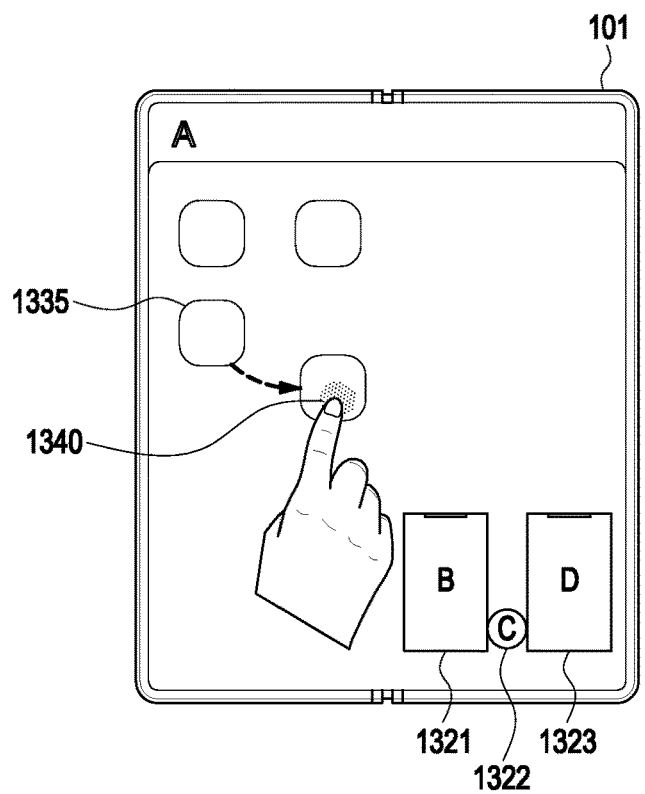

Referring to FIG. 13F, according to various embodiments, when there are several popup windows related to the first content 1335, the electronic device 101 may display the first floating icon 1321 and third floating icon 1323 related to the first content 1335 in a large size. In this case, the electronic device 101 may display the second floating icon 1322 not related to the first content 1335 in a small size.

Figure 14:
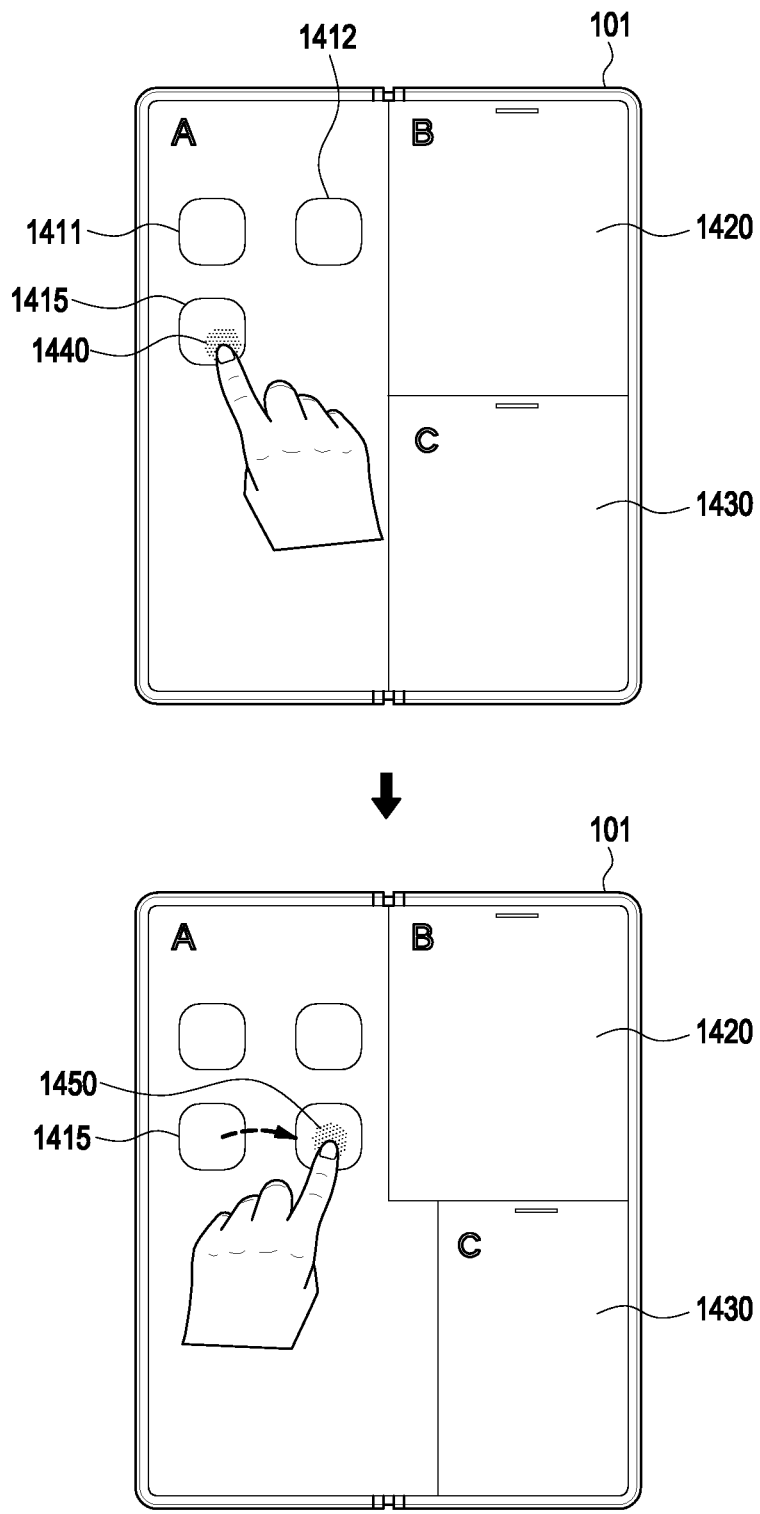
FIG. 14 is a view illustrating a user interface provided by an electronic device according to various embodiments.

FIG. 14 is a view illustrating a user interface provided by an electronic device according to various embodiments.

Referring to FIG. 14, the electronic device 101 may display a multi-window on the display 200. For example, the electronic device 101 may display a plurality of contents 1411, 1413, and 1415 of a first application on a first window 1410. Further, the electronic device 101 may display a second window 1420 and a third window 1430. For example, the second window 1420 may provide a function or information related to the first application. Further, the third window 1430 may provide a function or information not related to the first application.

According to various embodiments, the electronic device 101 may select a first content 1415 from among a plurality of contents 1411, 1413, and 1415 displayed on the first window 1410 based on a first input 1440 (e.g., a touch-and-hold input).

According to various embodiments, the electronic device 101 may display the second window 1420 related to the first content 1415 of the second window 1420 and the third window 1430 to be visually distinguished, based on identifying a second input 1450 (e.g., drag input) to move the selected first content 1415. For example, the electronic device 101 may display the second window 1420 to be larger than the third window 1430.

Figure 15:
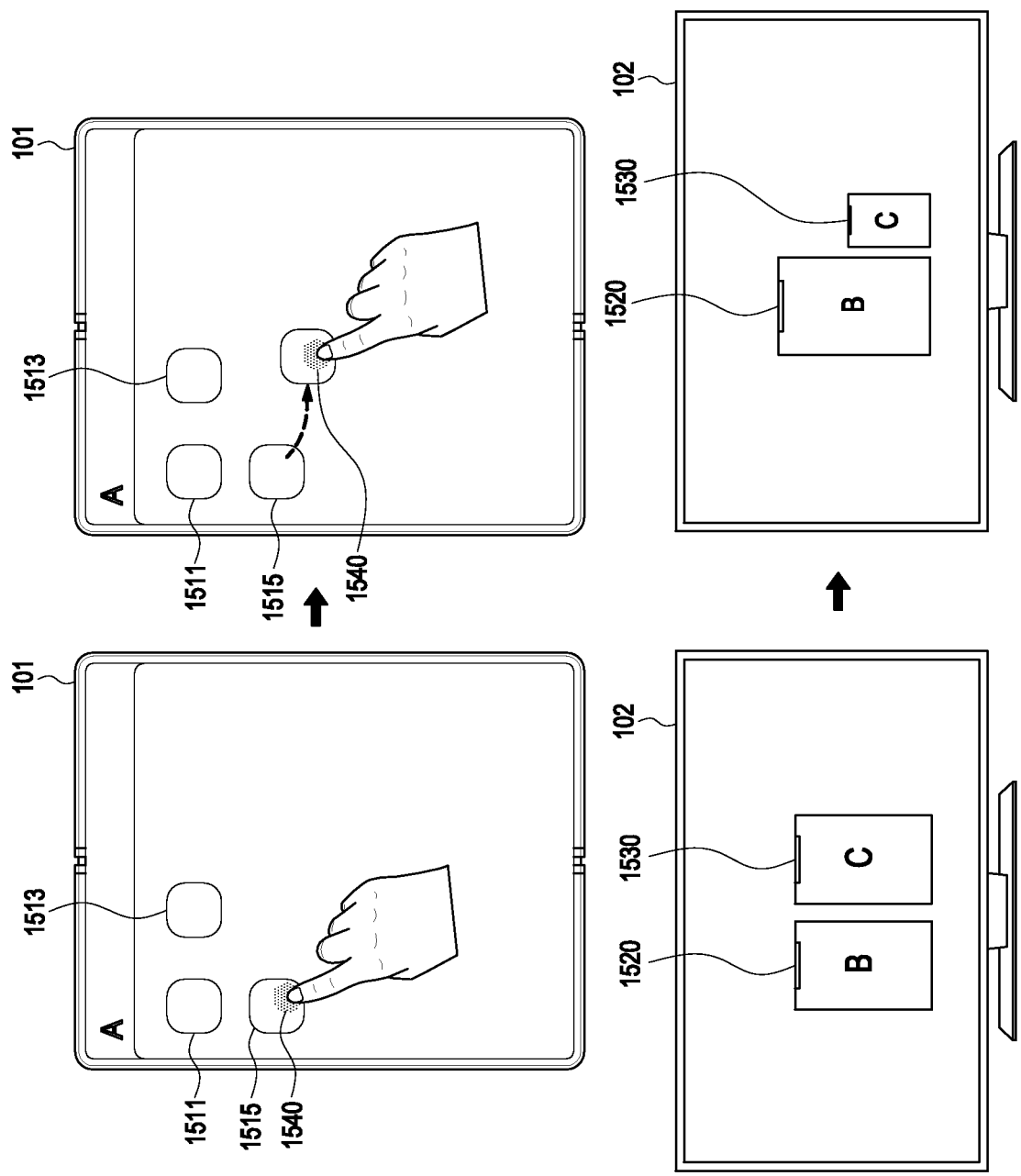
FIG. 15 is a view illustrating a user interface provided by an electronic device according to various embodiments.

FIG. 15 is a view illustrating a user interface provided by an electronic device according to various embodiments.

Referring to FIG. 15, according to various embodiments, the electronic device 101 may be connected with an external electronic device 102 via wireless communication. For example, the electronic device 101 may display a plurality of contents 1511, 1513, and 1515 of a first application on the display 200. The external electronic device 102 may display a second window 1520 and a third window 1530 on the display included in the external electronic device 102. For example, the second window 1520 may provide a function or information related to the first application. Further, the third window 1530 may provide a function or information not related to the first application.

According to various embodiments, the electronic device 101 may select a first content 1515 from among the plurality of contents 1511, 1513, and 1515 based on a first input 1540 (e.g., a touch-and-hold input).

According to various embodiments, if a second input 1550 (e.g., drag input) is identified to move the first content 1515 by the electronic device 101, the external electronic device 102 may display the second window 1520, related to the first content 1415 of the second window 1520 and the third window 1530, to be visually distinguished. For example, the electronic device 101 may transmit a control signal to the external electronic device 102 so that the external electronic device 102 displays the second window 1520 to be larger than the third window 1530.

Figure 16:
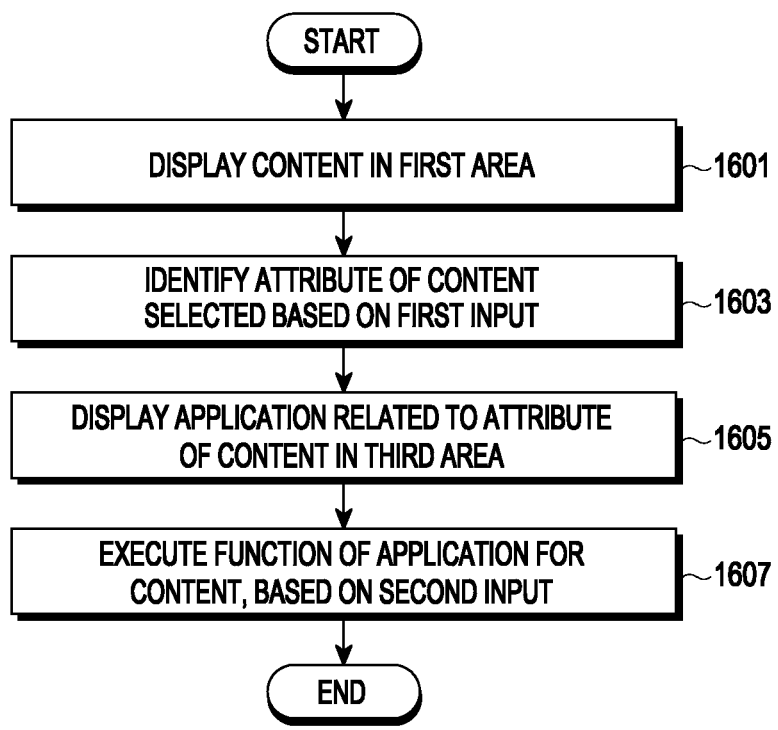
FIG. 16 is a flowchart illustrating operations of an electronic device according to various embodiments.

FIG. 16 is a flowchart illustrating operations of an electronic device according to various embodiments.

Referring to FIG. 16, according to various embodiments, in operation 1601, the electronic device 101 may display content in a first area of the display 200.

According to various embodiments, in operation 1603, the electronic device 101 may select a content based on a first input (e.g., a touch-and-hold input) and identify an attribute of the selected content. For example, the electronic device 101 may identify whether the selected content is text or image. If the selected content is text, the electronic device 101 may identify whether it includes a number. If the selected content is an image, the electronic device may identify whether it is a still image or video.

According to various embodiments, in operation 1605, the electronic device 101 may display an application related to the attribute of the content in a third area of the display. For example, if there are a plurality of applications related to the attribute of the content, the electronic device 101 may display the plurality of applications.

According to various embodiments, in operation 1607, the electronic device 101 may execute a function of an application for content, based on a second input (e.g., drag input) to move the content.

Figure 17:
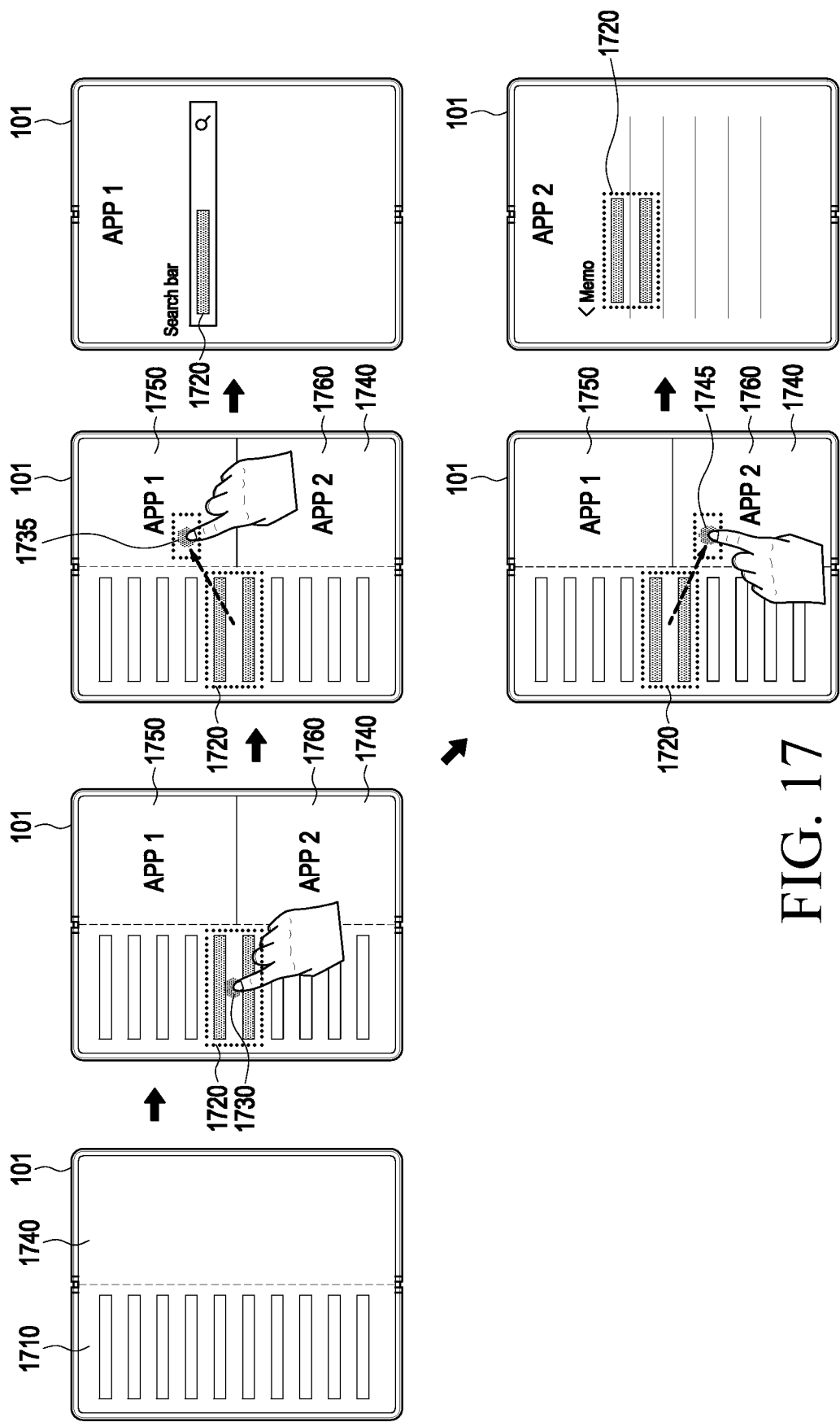
FIG. 17 is a view illustrating a user interface provided by an electronic device according to various embodiments.

FIG. 17 is a view illustrating a user interface provided by an electronic device according to various embodiments.

Referring to FIG. 17, according to various embodiments, the electronic device 101 may display contents in a first area 1710 of the display 200. For example, the content may include text.

According to various embodiments, the electronic device 101 may select a first content 1720 from among the contents based on a first input 1730 (e.g., a touch-and-hold input) and identify the attribute of the selected first content 1720. For example, the electronic device 101 may identify whether the first content 1720 is text or an image.

According to various embodiments, the electronic device 101 may display a first application 1750 and a second application 1760, related to the attribute (e.g., text) of the first content, in the third area 1740 of the display. For example, the first application 1750 may be a search application, and the second application 1760 may be a memo application.

According to various embodiments, the electronic device 101 may move the first content 1720 to the first application 1750 through a second input 1735 (e.g., drag input). If the second input 1735 is released (e.g., drag drop) on the first application 1750, the electronic device 101 may execute the first application 1750 using the first content 1720. For example, the electronic device 101 may input text indicated by the first content 1720 to an input field (e.g., a keyword input window) of the first application 1750 (e.g., search application).

According to various embodiments, the electronic device 101 may move the first content 1720 to the second application 1760 through a second input 1745 (e.g., drag input). If the second input 1745 is released (e.g., drag drop) on the second application 1760, the electronic device 101 may execute the second application 1760 using the first content 1720. For example, the electronic device 101 may input text indicated by the first content 1720 to an input field (e.g., a memo input field) of the second application 1760 (e.g., memo application). Or, the electronic device 101 may copy or cut the text indicated by the first content 1720.

Figure 18:
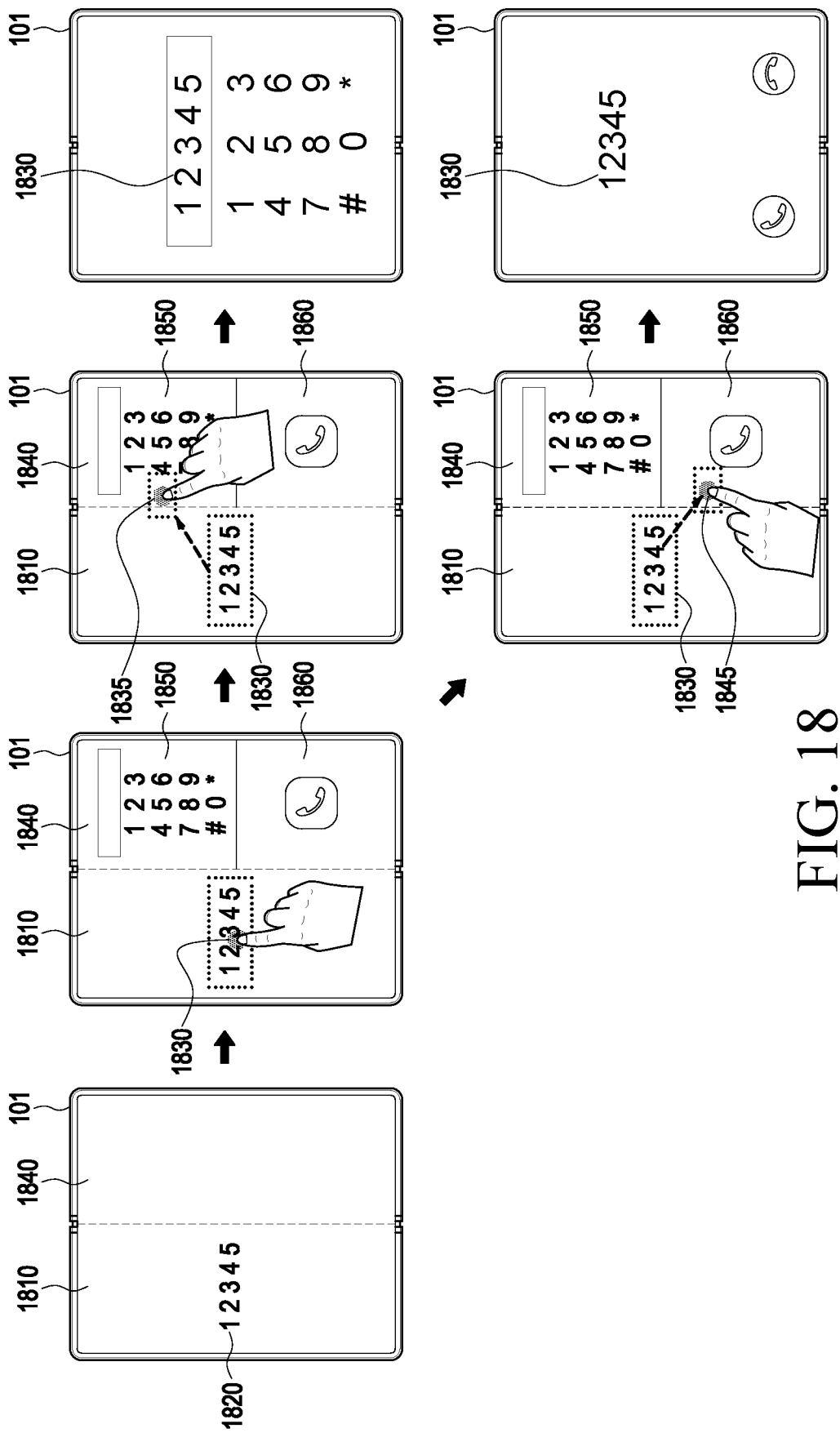
FIG. 18 is a view illustrating a user interface provided by an electronic device according to various embodiments.

FIG. 18 is a view illustrating a user interface provided by an electronic device according to various embodiments.

Referring to FIG. 18, according to various embodiments, the electronic device 101 may display content 1820 in a first area 1810 of the display 200. For example, the content 1820 may include a number.

According to various embodiments, the electronic device 101 may select content 1820 based on a first input 1880 (e.g., a touch-and-hold input) and identify the attribute of the selected content 1820. For example, the electronic device 101 may identify whether the content 1820 includes a number.

According to various embodiments, the electronic device 101 may display a first application 1850 and a second application 1860, related to the attribute (e.g., number) of the content 1820, in the third area 1840 of the display. For example, the first application 1850 may be a calculator application, and the second application 1860 may be a phone application.

According to various embodiments, the electronic device 101 may move the content 1820 to the first application 1850 through a second input 1835 (e.g., drag input). If the second input 1835 is released (e.g., drag drop) on the first application 1850, the electronic device 101 may execute the first application 1850 using the content 1820. For example, the electronic device 101 may input the number indicated by the content 1820 to an input field (e.g., a number input field) of the first application 1850 (e.g., calculator application).

According to various embodiments, the electronic device 101 may move the content 1820 to the second application 1860 through a second input 1845 (e.g., drag input). If the second input 1845 is released (e.g., drag drop) on the second application 1860, the electronic device 101 may execute the second application 1860 using the content 1820. For example, the electronic device 101 may input the number indicated by the content 1820 to an input field (e.g., a phone number input field) of the second application 1860 (e.g., phone application).

Figure 19:
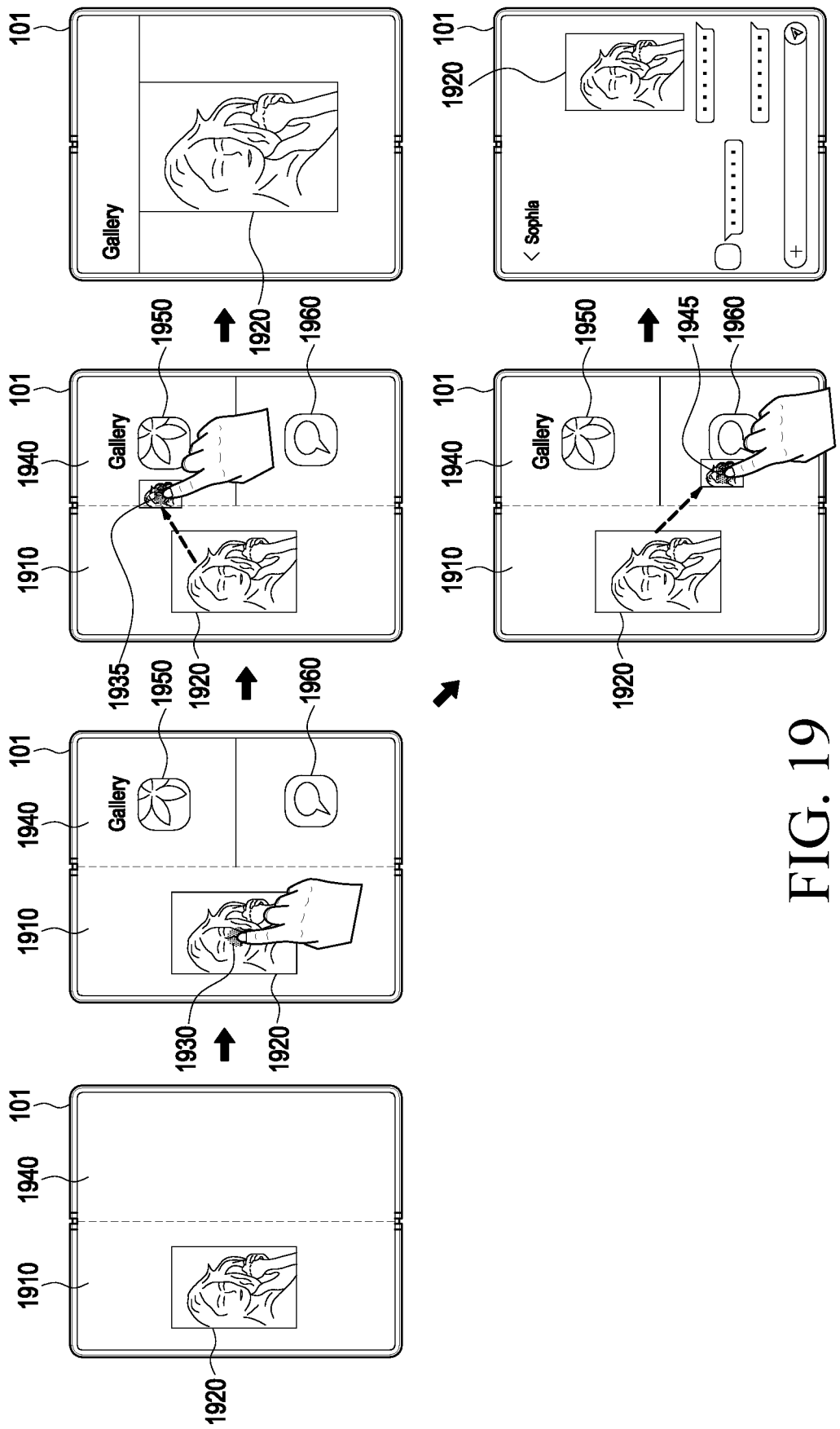
FIG. 19 is a view illustrating a user interface provided by an electronic device according to various embodiments.

FIG. 19 is a view illustrating a user interface provided by an electronic device according to various embodiments.

Referring to FIG. 19, according to various embodiments, the electronic device 101 may display content 1920 in a first area 1910 of the display 200. For example, the content 1920 may include an image.

According to various embodiments, the electronic device 101 may select content 1920 based on a first input 1930 (e.g., a touch-and-hold input) and identify the attribute of the selected content 1920. For example, the electronic device 101 may identify whether the content 1920 includes an image.

According to various embodiments, the electronic device 101 may display a first application 1950 and a second application 1960, related to the attribute (e.g., image) of the content 1920, in the third area 1940 of the display. For example, the first application 1950 may be a gallery application, and the second application 1960 may be an SNS application.

According to various embodiments, the electronic device 101 may move the content 1920 to the first application 1950 through a second input 1935 (e.g., drag input). If the second input 1935 is released (e.g., drag drop) on the first application 1950, the electronic device 101 may execute the first application 1950 using the content 1920. For example, the electronic device 101 may display the image indicated by the content 1920 through the first application (e.g., gallery application).

According to various embodiments, the electronic device 101 may move the content 1920 to the second application 1960 through a second input 1945 (e.g., drag input). If the second input 1945 is released (e.g., drag drop) on the second application 1960, the electronic device 101 may execute the second application 1960 using the content 1920. For example, the electronic device 101 may transmit the image indicated by the content 1920 to the other party through the second application 1960 (e.g., an SNS application).

According to various embodiments, an electronic device 101 may comprise a display 160 or 200 and a processor 120, wherein the processor is configured to control the display to display a plurality of contents related to an application in a first area of the display, and a plurality of objects for performing a plurality of functions related to the application in a second area of the display, select a first content from among the plurality of contents based on a first input on the display, identify at least one function corresponding to the first content among the plurality of functions, based on identifying a second input to the first content on the display, and control the display to display at least one object corresponding to the at least one function among the plurality of objects in the second area, to be visually distinguished.

The processor may be configured to control the display to enlarge a size of the second area in which the plurality of objects are displayed, based on a movement of the first content to a first object among the at least one object displayed in the second area of the display through the second input.

The processor may be configured to control the display to highlight and display the first object, based on a movement of the first content to a first object among the at least one object displayed in the second area of the display through the second input.

The processor may be configured to control the display to display a notification indicating non-executable, based on a movement of the first content to another object other than the at least one object displayed in the second area of the display through the second input.

The processor may be configured to control the display to display at least one sub object of a first object, based on a movement of the first content to the first object among the at least one object displayed in the second area of the display through the second input.

The processor may be configured to control the display to enlarge a size of the second area, based on the movement of the first content to the first object through the second input, and control the display to display the at least one sub object in the enlarged second area.

The processor may be configured to control the display to further display at least one sub object of a first sub object, based on a movement of the first content to the first sub object among the at least one sub object displayed in the second area of the display through the second input.

The processor may be configured to identify the plurality of objects displayed in the second area, based on a type of the application.

The second area may be implemented in a form of a navigation bar or a popup window.

The processor may be configured to perform a function corresponding to a first object for the first content, based on a release of the second input on the first object after the first content is moved to the first object through the second input.

The processor may be configured to move the first content to a folder or a group indicated by the first object.

The processor may be configured to register a contact or schedule indicated by the first content in a category indicated by the first object.

The processor may be configured to display or edit an image indicated by the first content through an application indicated by the first object.

The processor may be configured to play a video indicated by the first content through an application indicated by the first object.

According to various embodiments, a method for operating an electronic device 101 may comprise displaying a plurality of contents related to an application in a first area of a display 160 or 200 of the electronic device, displaying a plurality of objects for performing a plurality of functions related to the application in a second area of the display, selecting a first content from among the plurality of contents based on a first input on the display, identifying at least one function corresponding to the first content among the plurality of functions, based on identifying a second input to the first content on the display, and displaying at least one object corresponding to the at least one function among the plurality of objects displayed in the second area, to be visually distinguished.

The method for operating the electronic device may further comprise enlarging a size of the second area in which the plurality of objects are displayed, based on a movement of the first content to a first object among the at least one object displayed in the second area of the display through the second input.

The method for operating the electronic device may further comprise highlighting and displaying the first object, based on a movement of the first content to a first object among the at least one object displayed in the second area of the display through the second input.

The method for operating the electronic device may further comprise displaying at least one sub object of a first object, based on a movement of the first content to the first object among the at least one object displayed in the second area of the display through the second input.

The method for operating the electronic device may further comprise performing a function corresponding to a first object for the first content, based on a release of the second input after the first content is moved to the first object through the second input.

According to various embodiments, a non-transitory recording medium may store one or more programs, the one or more programs comprising instructions configured to, when executed by a processor of an electronic device, cause the electronic device to, display a plurality of contents related to an application in a first area of a display 160 or 200 of the electronic device 101, display a plurality of objects for performing a plurality of functions related to the application in a second area of the display, selecting a first content from among the plurality of contents based on a first input on the display, identify at least one function corresponding to the first content among the plurality of functions, based on identifying a second input to the first content on the display, and display at least one object corresponding to the at least one function among the plurality of objects displayed in the second area, to be visually distinguished.

What is claimed is:

1. An electronic device comprising:
   a display;
   a processor; and
   memory for storing instructions that, when executed by the processor, cause the electronic device to:
   display a plurality of contents related to an application in a first area of the display and a plurality of objects for performing a plurality of functions related to the application in a second area of the display,
   identify a first content from among the plurality of contents based on a first input on the first content in the first area of the display,
   identify at least one executable function corresponding to the first content among the plurality of functions, based on a second input to move the first content in the first area of the display, wherein the at least one executable function is able to be performed with the first content,
   while the second input is maintained on the first area of the display so that the first content is moved toward the second area of the display, display at least one first object corresponding to the at least one executable function for the first content among the plurality of objects together with at least one second object corresponding to at least one non-executable function for the first content among the plurality of objects displayed in the second area, wherein the at least one first object and the at least one second object are displayed to be visually distinguished from each other while the second input is maintained on the first area of the display, and
   when the first content is moved to an object among the at least one first object corresponding to the at least one executable function for the first content and the second input for the first content is released after the first content is moved to the object among the at least one first object, perform a function corresponding to the object among the at least one first object with respect to the first content.

2. The electronic device of claim 1, wherein the instructions that, when executed by the processor, cause the electronic device to enlarge a size of the second area in which the plurality of objects are displayed, based on movement of the first content to the object among the at least one first object displayed in the second area of the display through the second input.

3. The electronic device of claim 1, wherein the instructions that, when executed by the processor, cause the electronic device to highlight and display the object among the at least one first object displayed in the second area of the display, based on movement of the first content to the object among the at least one first object through the second input.

4. The electronic device of claim 1, wherein the instructions that, when executed by the processor, cause the electronic device to display a notification indicating non-executable, when the first content is moved to an object in the second area among the at least one second object corresponding to the at least one non-executable function for the first content based on the second input for the first content.

5. The electronic device of claim 1, wherein the instructions that, when executed by the processor, cause the electronic device to display at least one sub object of the object among the at least one first object, based on movement of the first content to the object among the at least one first object displayed in the second area of the display through the second input.

6. The electronic device of claim 5, wherein the instructions that, when executed by the processor, cause the electronic device to,
   enlarge a size of the second area, based on the movement of the first content to the object among the at least one first object through the second input, and
   display the at least one sub object in the enlarged second area.

7. The electronic device of claim 6, wherein the instructions that, when executed by the processor, cause the electronic device to further display at least one sub object of a first sub object, based on movement of the first content to the first sub object among the at least one sub object displayed in the second area of the display through the second input.

8. The electronic device of claim 1, wherein the instructions that, when executed by the processor, cause the electronic device to identify the plurality of objects displayed in the second area, based on a type of the application.

9. The electronic device of claim 1, wherein the second area is implemented in a form of a navigation bar or a popup window.

10. The electronic device of claim 1, wherein the instructions that, when executed by the processor, cause the electronic device to move the first content to a folder or a group indicated by the object among the at least one first object.

11. The electronic device of claim 1, wherein the instructions that, when executed by the processor, cause the electronic device to register a contact or schedule indicated by the first content in a category indicated by the object among the at least one first object.

12. The electronic device of claim 1, wherein the instructions that, when executed by the processor, cause the electronic device to display or edit an image indicated by the first content through an application indicated by the object among the at least one first object.

13. The electronic device of claim 1, wherein the instructions that, when executed by the processor, cause the electronic device to play a video indicated by the first content through an application indicated by the object among the at least one first object.

14. A method for operating an electronic device, the method comprising:
   displaying a plurality of contents related to an application in a first area of a display of the electronic device;

displaying a plurality of objects for performing a plurality of functions related to the application in a second area of the display;

identifying a first content from among the plurality of contents based on a first input on the first content in the first area of the display;

identifying at least one executable function corresponding to the first content among the plurality of functions, based on a second input to move the first content in the first area of the display, wherein the at least one executable function is able to be performed with the first content;

displaying, while the second input is maintained on the first area of the display so that the first content is moved toward the second area of the display, at least one first object corresponding to the at least one executable function for the first content among the plurality of objects together with at least one second object corresponding to at least one non-executable function for the first content among the plurality of objects displayed in the second area, wherein the at least one first object and the at least one second object are displayed to be visually distinguished from each other while the second input is maintained on the first area of the display; and when the first content is moved to an object among the at least one first object corresponding to the at least one executable function for the first content and the second input for the first content is released after the first content is moved to the object among the at least one first object, performing a function corresponding to the object among the at least one first object with respect to the first content.

15. The method of claim 14, further comprising enlarging a size of the second area in which the plurality of objects are displayed, based on movement of the first content to the object among the at least one first object displayed in the second area of the display through the second input.

16. The method of claim 14, further comprising highlighting and displaying the object among the at least one first object displayed in the second area of the display, based on a movement of the first content to the object among the at least one first object through the second input.

17. The method of claim 14, further comprising displaying at least one sub object of a first object, based on a movement of the first content to the first object among the at least one first object displayed in the second area of the display through the second input.

18. The method of claim 14, further comprising, when the first content is moved to an object in the second area among the at least one second object corresponding to the at least one non-executable function for the first content based on the second input for the first content, displaying a notification indicating non-executable.

19. A non-transitory recording medium storing one or more programs, the one or more programs comprising instructions configured to, when executed by a processor of an electronic device, cause the electronic device to:

display a plurality of contents related to an application in a first area of a display of the electronic device;

display a plurality of objects for performing a plurality of functions related to the application in a second area of the display;

identify a first content from among the plurality of contents based on a first input on the first content in the first area of the display;

identify at least one executable function corresponding to the first content and the plurality of functions, based on a second input to move the first content in the first area of the display, wherein the at least one executable function is able to be performed with the first content;

display, while the second input is maintained on the first area of the display so that the first content is moved toward the second area of the display, at least one first object corresponding to the at least one executable function for the first content among the plurality of objects together with at least one second object corresponding to at least one non-executable function for the first content among the plurality of objects displayed in the second area, wherein the at least one first object and the at least one second object are displayed to be visually distinguished from each other while the second input is maintained on the first area of the display; and when the first content is moved to an object among the at least one first object corresponding to the at least one executable function for the first content and the second input for the first content is released after the first content is moved to the object among the at least one first object, perform a function corresponding to the object among the at least one first object with respect to the first content.

\* \* \* \* \*